(12) United States Patent
Stewart, III

(10) Patent No.: US 10,619,985 B1
(45) Date of Patent: Apr. 14, 2020

(54) MAGAZINE DISPENSING CONTAINER AND SYSTEM

(71) Applicant: Talmage P. Stewart, III, Frederick, PA (US)

(72) Inventor: Talmage P. Stewart, III, Frederick, PA (US)

(*) Notice: Subject to any disclaimer, the term of this patent is extended or adjusted under 35 U.S.C. 154(b) by 0 days.

(21) Appl. No.: 16/165,143

(22) Filed: Oct. 19, 2018

(51) Int. Cl.
*B65G 59/02* (2006.01)
*F42B 39/00* (2006.01)
*F42B 39/26* (2006.01)
*F42B 39/02* (2006.01)

(52) U.S. Cl.
CPC ............ *F42B 39/002* (2013.01); *B65G 59/02* (2013.01); *F42B 39/02* (2013.01); *F42B 39/26* (2013.01)

(58) Field of Classification Search
None
See application file for complete search history.

(56) References Cited

U.S. PATENT DOCUMENTS

| | | | |
|---|---|---|---|
| 1,175,907 A | 3/1916 | Slade | |
| 2,122,003 A | 6/1938 | Cooper | |
| 2,902,196 A | 9/1959 | Gray | |
| 3,095,117 A | 6/1963 | Keefe | |
| 3,219,244 A * | 11/1965 | Blask | F42B 39/02 221/310 |
| 4,180,182 A | 12/1979 | Fish | |
| 4,555,097 A * | 11/1985 | Hiatt | A47C 23/0438 267/100 |
| 5,174,482 A | 12/1992 | Rogers et al. | |
| 5,178,298 A * | 1/1993 | Allina | B65D 83/0418 206/457 |
| 5,492,213 A | 2/1996 | Kim | |
| 5,649,642 A | 7/1997 | Mabry et al. | |
| 6,202,908 B1 | 3/2001 | Groover | |
| 6,425,495 B1 * | 7/2002 | Senda | B65D 83/0418 221/210 |
| 6,427,839 B1 * | 8/2002 | Helfer-Grand | A45C 3/00 150/112 |
| 6,668,479 B1 | 12/2003 | Obong | |
| 7,364,057 B2 | 4/2008 | Carroll | |
| 7,404,223 B2 | 7/2008 | Manuszak et al. | |

(Continued)

OTHER PUBLICATIONS

"Pouches STRAC Technologies: FAST System preview", https://www.milspecmonkey.com/weargear/pouches/209-strac-technologies-fast-system-preview—Jun. 24, 2008, pp. 1-3; and image page.

*Primary Examiner* — Gene O Crawford
*Assistant Examiner* — Ayodeji T Ojofeitimi
(74) *Attorney, Agent, or Firm* — Bonini IP Law, LLC; Frank J. Bonini, Jr.

(57) ABSTRACT

A system and devices for storing and dispensing magazines that are pre-loaded with ammunition for firearms, the device including a body having a space therein, a dispensing opening, a supporting platform on which the magazines are supported, and a spring that biases the platform toward the dispensing opening to present the magazine, and the next magazine to the dispensing opening for discharge from the device. The spring is collapsible and has substantially rectangular segments. The top of the spring is captured within a space formed at the top of the platform, and the bottom of the spring is guided with a spring guide. The device may be carried on a person, and may releasably attach to a user's clothing.

27 Claims, 22 Drawing Sheets

(56) References Cited

U.S. PATENT DOCUMENTS

| | | | |
|---|---|---|---|
| 7,806,293 B2 | 10/2010 | Altieri et al. | |
| 8,021,208 B2 | 9/2011 | Victor | |
| 8,104,640 B2 | 1/2012 | Selvtetti | |
| 8,337,368 B2 | 12/2012 | Weller | |
| 8,684,342 B2 | 4/2014 | Fenioux et al. | |
| 8,844,950 B2 * | 9/2014 | Greene | B25H 1/04 |
| | | | 280/30 |
| 8,944,283 B2 | 2/2015 | Shiell | |
| 8,979,079 B2 | 3/2015 | DeFrank et al. | |
| 9,506,706 B2 | 11/2016 | Higley | |
| 9,927,218 B1 | 3/2018 | Schlang | |
| 10,197,371 B2 | 2/2019 | Brozda | |
| 2005/0017043 A1 * | 1/2005 | Link | F42B 39/02 |
| | | | 224/674 |
| 2005/0189371 A1 | 9/2005 | Harvey | |
| 2006/0273102 A1 * | 12/2006 | Wieser | A47K 10/422 |
| | | | 221/59 |
| 2010/0187271 A1 * | 7/2010 | Selvetti | F41A 9/61 |
| | | | 224/196 |
| 2010/0327006 A1 * | 12/2010 | Campo | F41A 9/82 |
| | | | 221/185 |
| 2019/0011242 A1 | 1/2019 | Brozda | |
| 2019/0154424 A1 | 5/2019 | Brozda | |

\* cited by examiner

MAGAZINE DISPENSING CONTAINER AND SYSTEM

BACKGROUND OF THE INVENTION

1. Field of the Invention

The present invention relates to firearms that are loaded with magazines that contain ammunition, and more particularly to a device and system for storing and dispensing multiple magazines loaded with ammunition, and devices and systems where the magazine storing and dispensing unit is carried by a user through a handle or being worn on the body.

2. Brief Description of the Related Art

Users of firearms typically store and carry ammunition, and must load the ammunition from time to time. Firearm ammunition for a number of firearms typically is stored in clips or magazines, where the cartridges (e.g., bullets) are stored in the magazine and are available for use when the magazine is loaded into the firearm. A typical arrangement may be a stacked array of bullets that are contained in the magazine. A typical magazine may operate by moving the cartridges held therein to a location within the firearm, where the cartridge may be loaded into a chamber of the firearm and discharged (fired). A typical magazine is designed to fit into a socket of the firearm. The connection between magazines and firearms is often referred to as an interface, and the magazine may be inserted into the firearm socket, and, when its contents of cartridges are dispensed, removed, and another pre-loaded magazine may be inserted to replace it.

Since magazines often contain a limited number of rounds (cartridges), there is a need to carry additional pre-loaded magazines. Examples of a need for multiple magazines include situations where a firearm user must reload often, such as when a firearm user is at a range for target practice, or where law enforcement or the military personnel are engaged in an active conflict.

Difficulty in removing a stored magazine from a compartment or device for use may be detrimental to the user, and have serious consequences. Having pre-loaded magazines available is essential in many situations. Spare magazines are often utilized during extreme life-threatening combat situations, where the failure to quickly reload a full magazine while engaged in a threatening situation, such as a combat or gun battle, can result in serious injury, capture, and/or death. Magazine carriers must allow rapid and easy access to a full magazine for reloading a weapon (firearm), so that firing may be resumed with minimal delay. Magazine carriers have been typically mounted or fastened on a user's belt, vest, or other garment worn by the user, so that the magazine carrier and contents are within the user's grasp.

There have been devices designed to hold magazines. Some carriers have been designed to be carried on the person. One example is a spare magazine carrier that has a carrier frame for seating and supporting at least one ammunition magazine, and a downwardly retractable flap for covering and retaining the seated ammunition magazine. Another magazine holder is disclosed in U.S. Pat. No. 5,617,582, which is a load bearing vest having pouches with flaps and a drawstring for lifting and holding the flaps up and away from the pouch. In the drawstring type device, even when pulled open using a drawstring, the flap may remain in the exit path of the spare magazine. Another magazine carrier in U.S. Pat. No. 5,484,093 discloses a magazine pouch that uses a tensioning bolt to friction fit a spare magazine in a main body portion. However, without the protective flap, there is a risk of dislodgement in situations where movement or agitation is experienced, such as in combat or a law enforcement situation.

Another type of magazine holder is disclosed in U.S. Pat. No. 8,944,283, which provides a self-dispensing container designed to dispense magazines by providing an inclined plane opposite a magazine ejection port.

A need exists for a magazine holder which is able to contain and store pre-loaded magazines, and allow access to the magazines by dispensing the magazines from the container for immediate use.

SUMMARY OF THE INVENTION

A system and devices for storing and dispensing magazines that are used for firearms is provided. The system and devices are designed to hold pre-loaded magazines (i.e., magazines preloaded with cartridges for a firearm) and/or unloaded magazines, and to release pre-loaded magazines (or unloaded magazines) from the device as needed by a user. The device also is configured to be carried on the person or user, and may include a handle for carrying the device, or a suitable attachment mechanism for securing the device to the user or user's clothing or other articles worn by the user (e.g., a combat vest, holster, belt, or the like).

The magazine holder and dispenser is configured to hold a plurality of magazines. Examples include the capability to hold, four, or six, or eight, or other numbers of magazines that may be desirable to have available. The magazine holder and dispenser may be sized to contain particular types of firearm magazines, of varying sizes, shapes, and types.

The magazine dispenser provides easy access for storage, containment and use of pre-loaded magazines for firearm users. Outdoor enthusiasts, gun enthusiasts, as well as military, police and other law enforcement personnel may utilize the magazine dispenser in connection with firearm activity, whether it is practicing at a rage, or in drills, or in an actual combat or law enforcement situation. In addition, the magazine dispenser may be easily stored in a gun cabinet or gun safe, so that the ammunition is in one place, in a secure location. The magazine dispenser may be readily removed from the gun safe or other storage area when needed, and transported to the location of use. The magazine dispenser may be provided with suitable carrying mechanisms, such as a handle, strap, belt loops, bags, or other suitable component for carrying one or more of the magazine devices that have been pre-loaded with ammunition or rounds (e.g., in magazines).

According to preferred embodiments, the magazine device may be configured to store and dispense magazines that have different radii or curvatures and different thicknesses and dimensions. According to some preferred embodiments of the magazine dispenser, the cavity and profile of the interior walls are dimensioned and sized to accommodate the desired magazines therein, so that the magazines may be loaded, held, and dispensed therefrom.

According to preferred embodiments, the magazines may be stored in the device in a stacked arrangement. The pre-loaded magazines (which are magazines pre-loaded with cartridges), may be loaded in to the magazine holder by passing them through an opening. The opening may server as both the loading opening and the dispensing opening.

The device preferably contains a biasing mechanism, which according to some preferred embodiments comprises a spring. Preferably, the spring is designed to collapse onto itself, and in a concentrically positioned configuration to maximize the space above the spring. The spring is constructed from a suitable material and has suitable resiliency to bias the number of cartridges that fit in the stacked arrangement in the device. The device is designed for multiple uses, and may be loaded with an initial plurality of pre-loaded magazines, and upon dispensing the initial load of magazines, or upon dispensing one or more of the magazines, may receive additional pre-loaded magazines (so that the magazine may be at its capacity).

The device preferably includes a holding mechanism for securing the device to a user or user's clothing or other article worn or carried by the user. Embodiments of the device also may be provided so that a user is carrying the device loaded with the pre-loaded magazines for access and use by another person. For example, the device may be situated for mounting on the back of a person that carried the device, so that a following user, such as, for example, in a combat situation, may access the magazines from the device from the back of the carrying user. According to some preferred embodiments, a mounting mechanism may include Velcro®, or a clip, or a handle (to which a clip or cord may attach, or that may be grasped and carried by a person).

According to some embodiments, a mounting mechanism may be configured as a mounting structure that is affixed to or removably attachable to and from the device. According to some embodiments the mounting mechanism includes a mating structure attachable to or carried on the user, such as, for example, on the user's clothing, combat vest or the like. The attachable mating structure is designed to releasably secure with the device or mounting structure thereon. Preferably, the mounting mechanism allows for rapid removal and attachment of the magazine holding and dispensing device.

The magazine dispensing devices of the invention may be constructed in any suitable manner, using suitable materials. Preferably, the materials are weather resistant, and are durable. According to some preferred embodiments, the devices may be constructed or otherwise formed from plastic. The device may be formed by injection molding of some or all of the body portions, and by securing together one or more parts to construct the device. The device may be constructed having a body that is molded so as to minimize or prevent debris and dirt from entering the device.

BRIEF DESCRIPTION OF THE DRAWING FIGURES

DETAILED DESCRIPTION OF THE PREFERRED EMBODIMENTS

Figure 1:
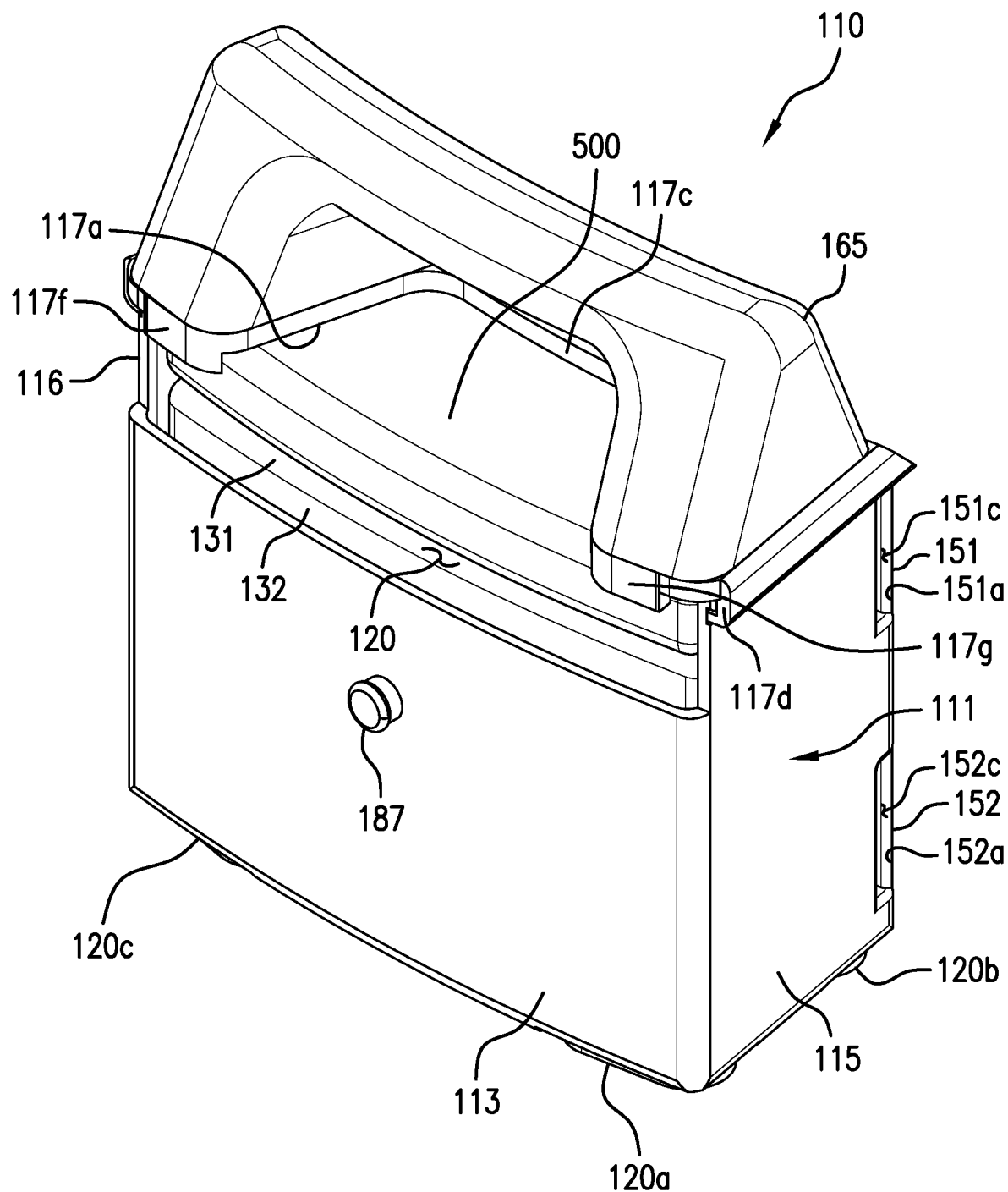
FIG. 1 is a perspective view of a device for holding and dispensing magazines in accordance with a preferred embodiment of the invention.

Referring to FIGS. 1-9B, a system and device 110 for storing and dispensing magazines is depicted showing a preferred embodiment of the invention. The device 110 has a body 111 and a cavity or space 112 therein. The body 111 is shown comprising a walled structure having a front wall 113, rear wall 114, a first side wall 115 and second side wall 116. The body also has a top 117 and a bottom 118.

Figure 2A:
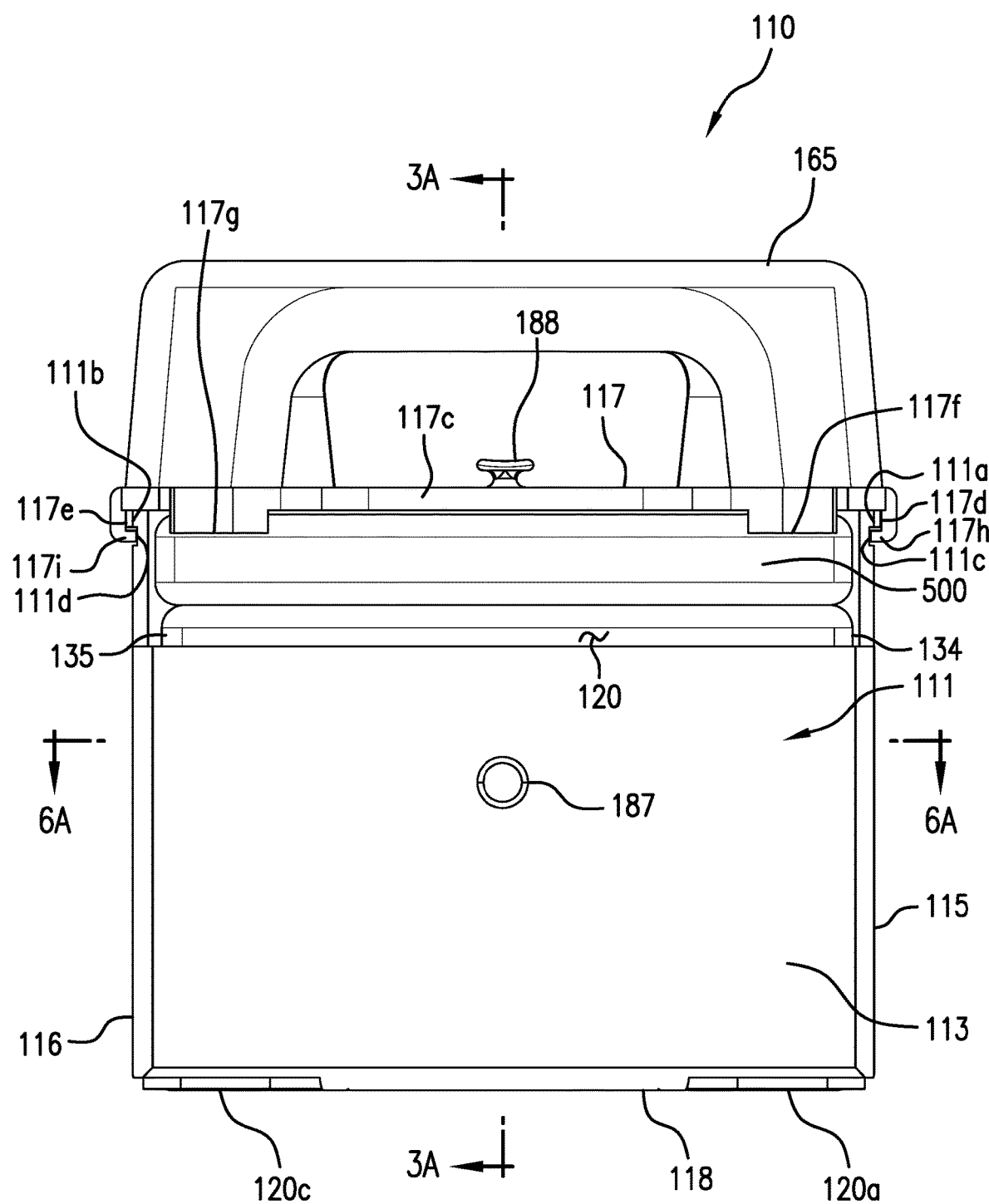
FIG. 2A is a front elevation view of the device of FIG. 1 shown with a magazine loaded in the device, and being shown with the spring in a first biasing condition.
Figure 4:
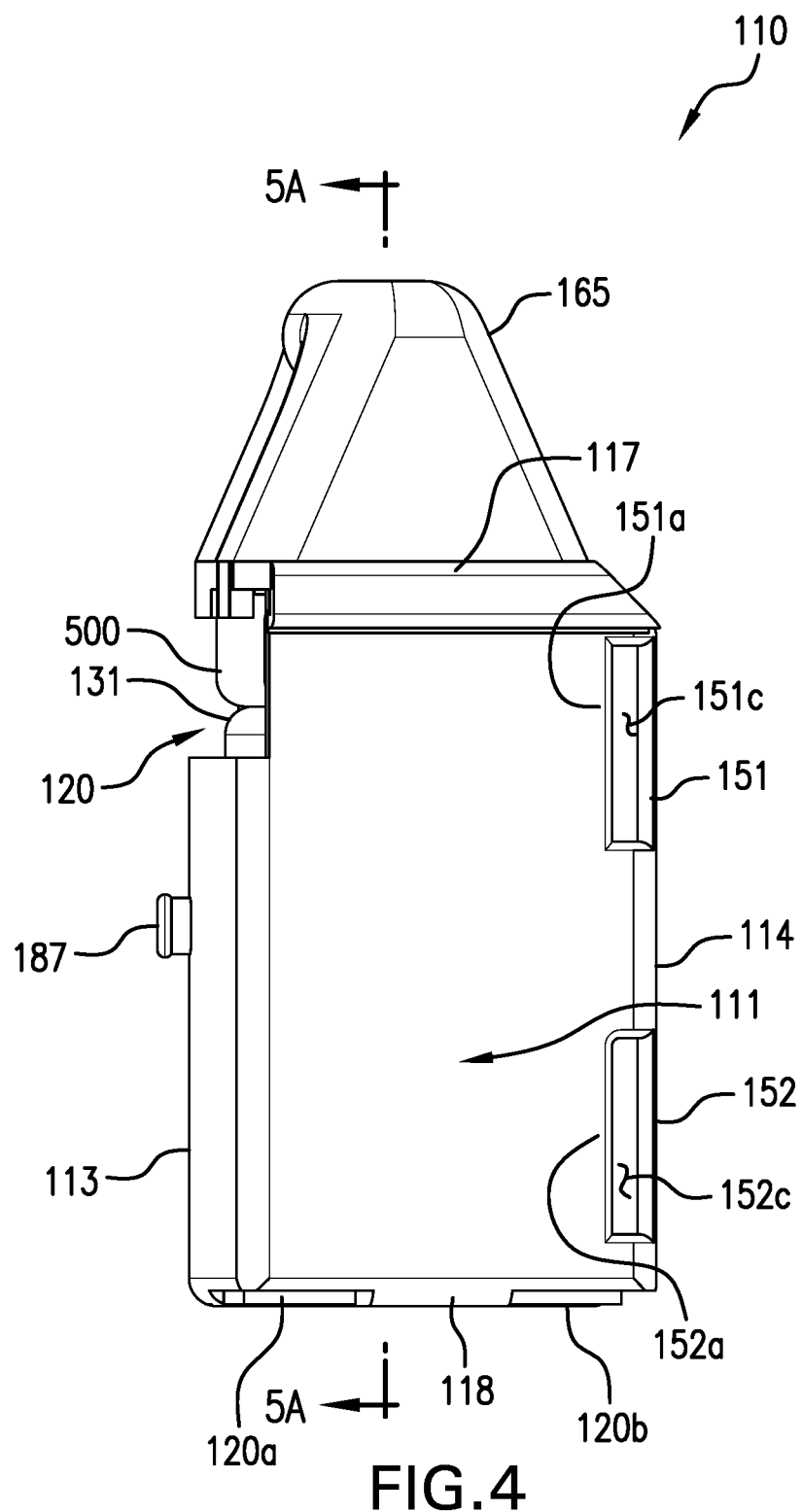
FIG. 4 is a right side elevation view of the device of FIG. 1.
Figure 8A:
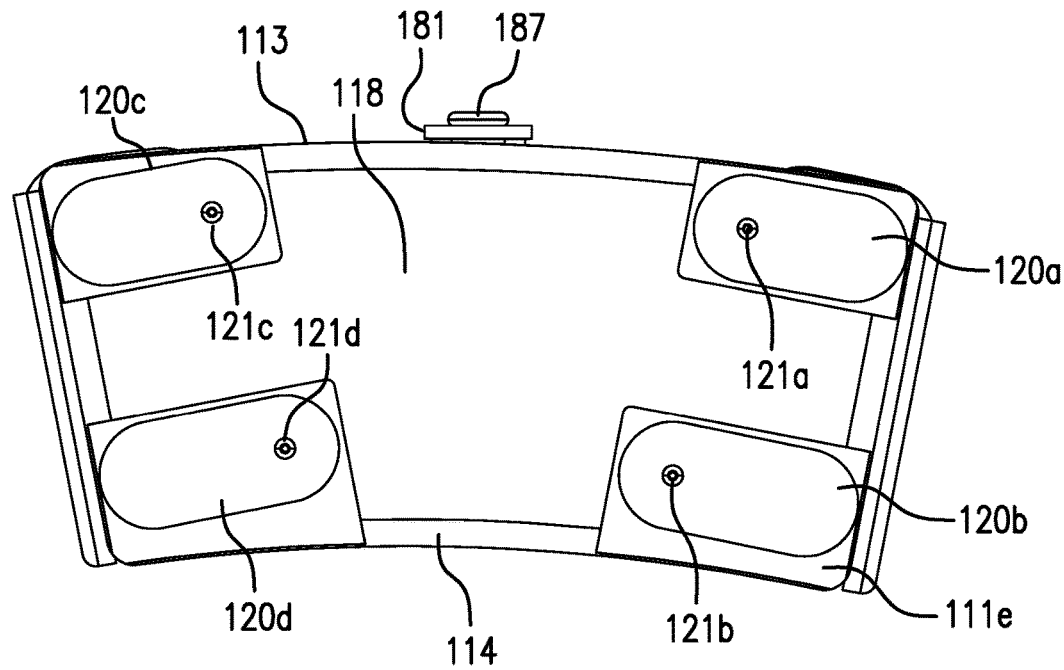
FIG. 8A is a bottom plan view of the device of FIG. 1.
Figure 8B:
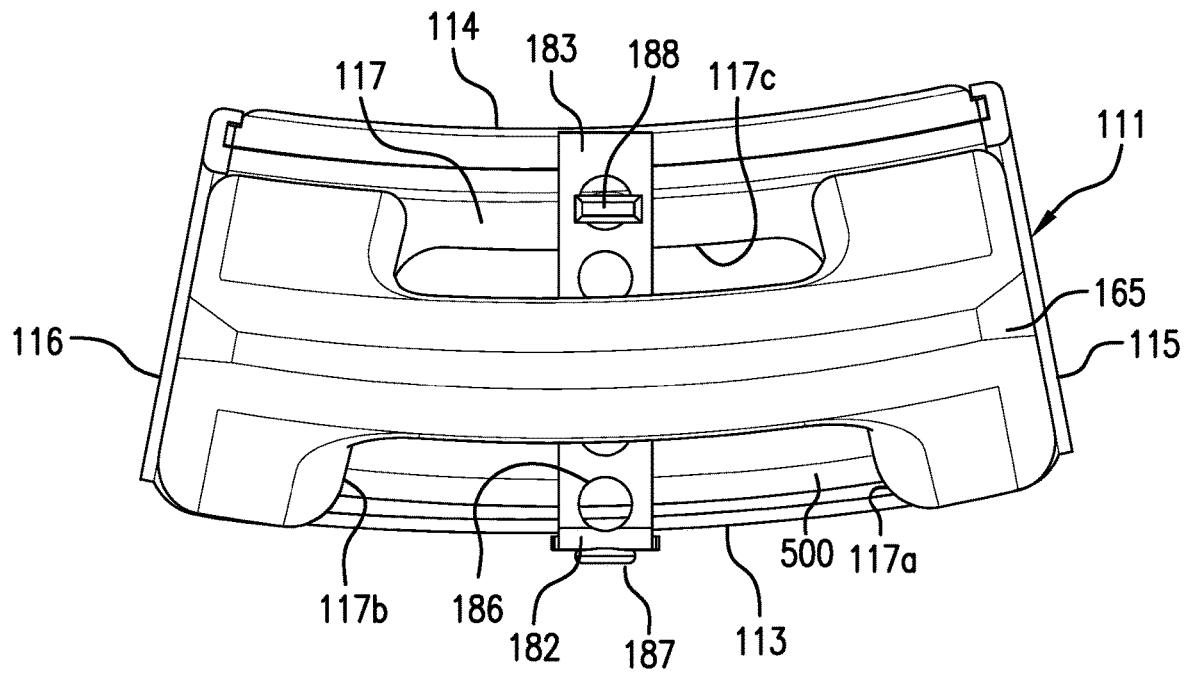
FIG. 8B is a top plan view of the device of FIG. 1.

According to some embodiments, a support such as a stand may be provided, such as the feet 120a, 120b, 120c, 120d shown at the bottom of the device 110 (FIGS. 2A, 4 and 8A). The feet 120a, 120b, 120c, 120d preferably are located to provide stability when the device 110 is resting on a surface. The feet 120a, 120b, 120c, 120d, according to preferred embodiments are mounted on the device body 111 so that they may be moved into position as needed, and retracted or moved out of position when not needed (e.g., when the device 110 is being carried, worn by a user, and the like). The embodiment of the device 110 illustrated shows the feet 120a, 120b, 120c, 120d each being movably mounted by a pivot connection that secures the respective foot to the body 111. For purposes of illustration, the foot 120b is shown in solid line representation where it is retracted in a recess 111e of the device bottom 118. The other feet 120a, 120c, 120d also may be situated within a recess.

A rivet or other fastener 121*b* is shown connecting the foot 120*b* to the device bottom 118. The broken line representation shown the foot 120*b'* in a pivoted position, being rotated about the pivot fastener 121*b* where it is disposed outwardly from the bottom of the device 110. The other feet 120*a*, 120*c*, 120*d*, also are pivotally mounted by respective fasteners 121*a*, 121*c*, 121*d*, and may pivot about the fastener to be positioned outwardly from the device body 111, similar to the pivoted foot 120*b'*.

Figure 6A:
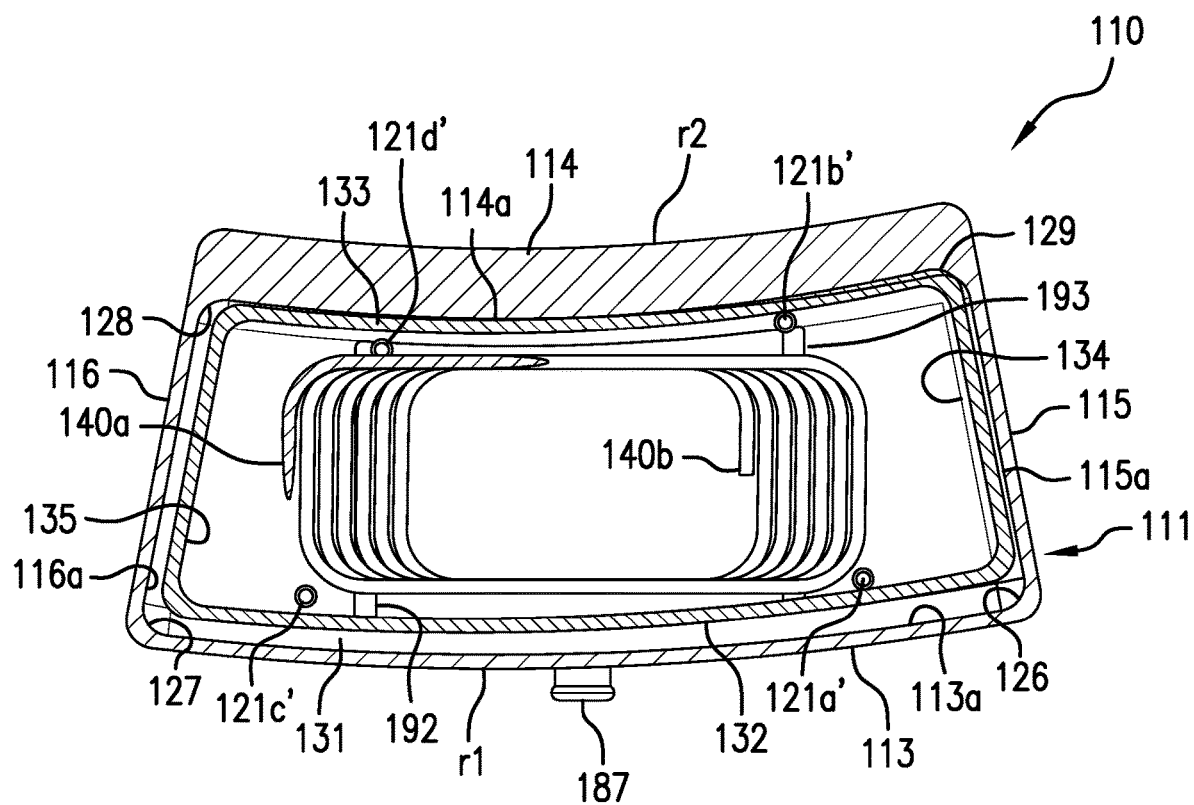
FIG. 6A is a sectional view of the device of FIG. 2A taken along the section line 6-6 of FIG. 2A.
Figure 6B:
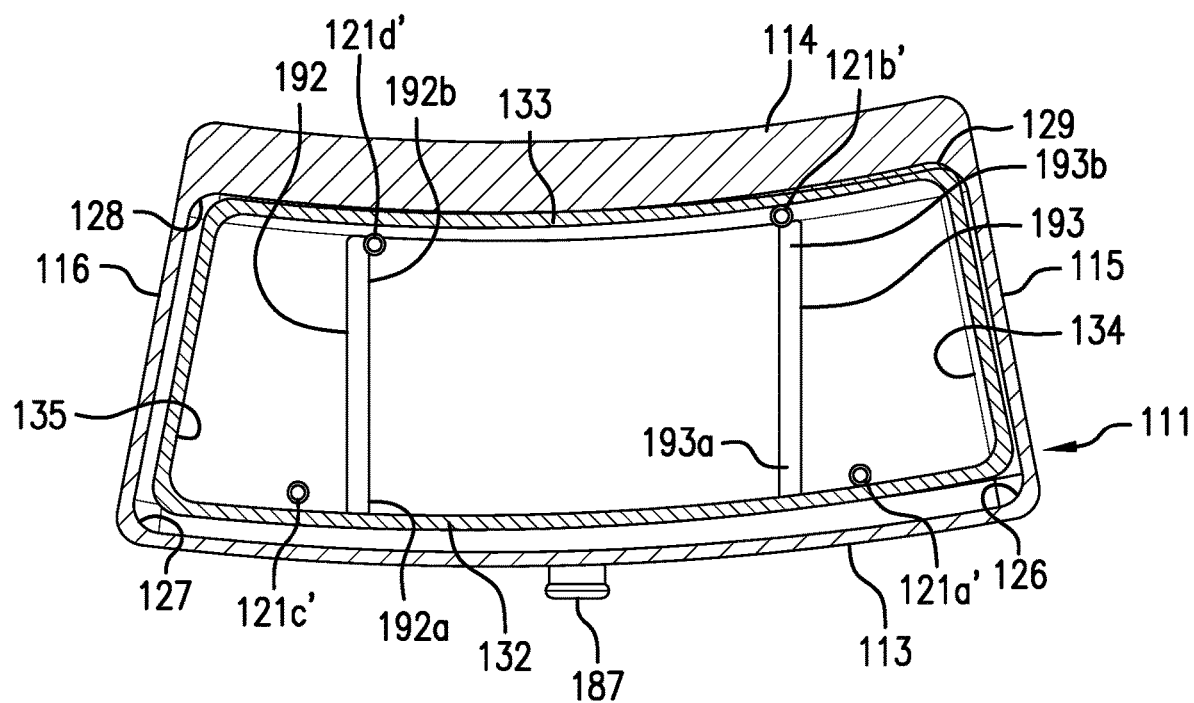
FIG. 6B is the sectional view of the device of FIG. 6A, but shown without the strap and spring.

According to some embodiments, the pivot fasteners 121*a*, 121*b*, 121*c*, 121*d*, may extend through the device bottom 118 and into the cavity 112 to provide a guide for the biasing element, such as the spring 140. The fasteners may provide the guide themselves (such as in the form of a post) or may secure to another element, such as a bushing, post, flange or other support, to secure the feet as well as a guide or support for the spring 140. As shown in FIGS. 6A and 6B, an exemplary embodiment is illustrated where the pivot fasteners (121*a*, 121*b*, 121*c*, 121*d*, FIG. 8A) protrude through the device bottom 118, and are shown having respective portions 121*a'*, 121*b'*, 121*c'*, 121*d'* extending into the device interior cavity 112. Although shown along with the rails 192, 193 in FIGS. 6A and 6B, according to some embodiments, the pivot fastener portions 121*a'*, 121*b'*, 121*c'*, 121*d'* may be provided for use as a spring guide without the rails. The pivot fasteners and the feet 120*a*, 120*b*, 120*c*, 120*d* (FIG. 8A) may be located to provide a suitable position to serve as a spring guide, as well as to keep the box stable when the feet are extended.

Figure 9A:
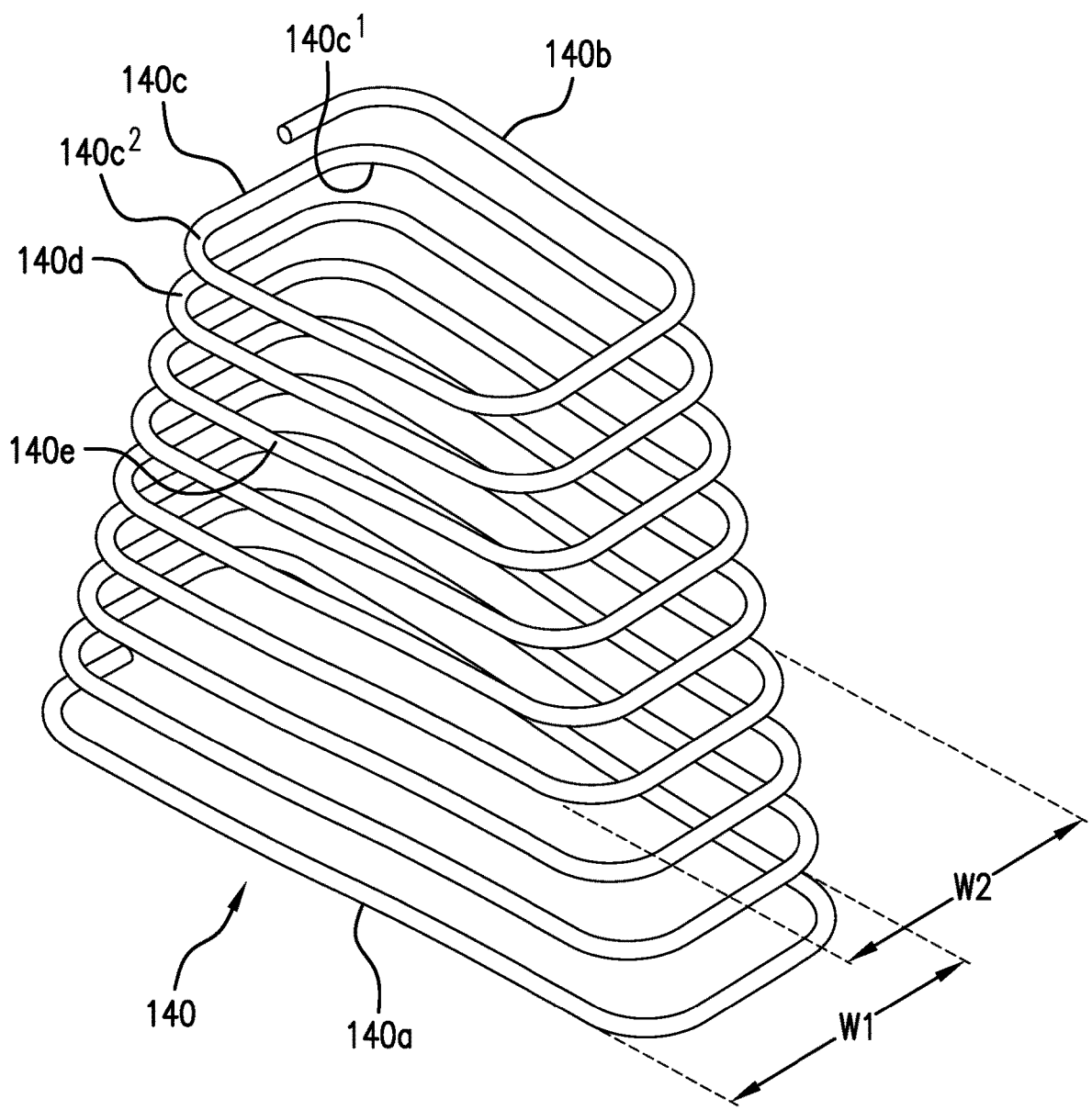
FIG. 9A is a perspective view of a spring shown separately from the device and other components, the spring being shown in an uncompressed condition.
Figure 9B:
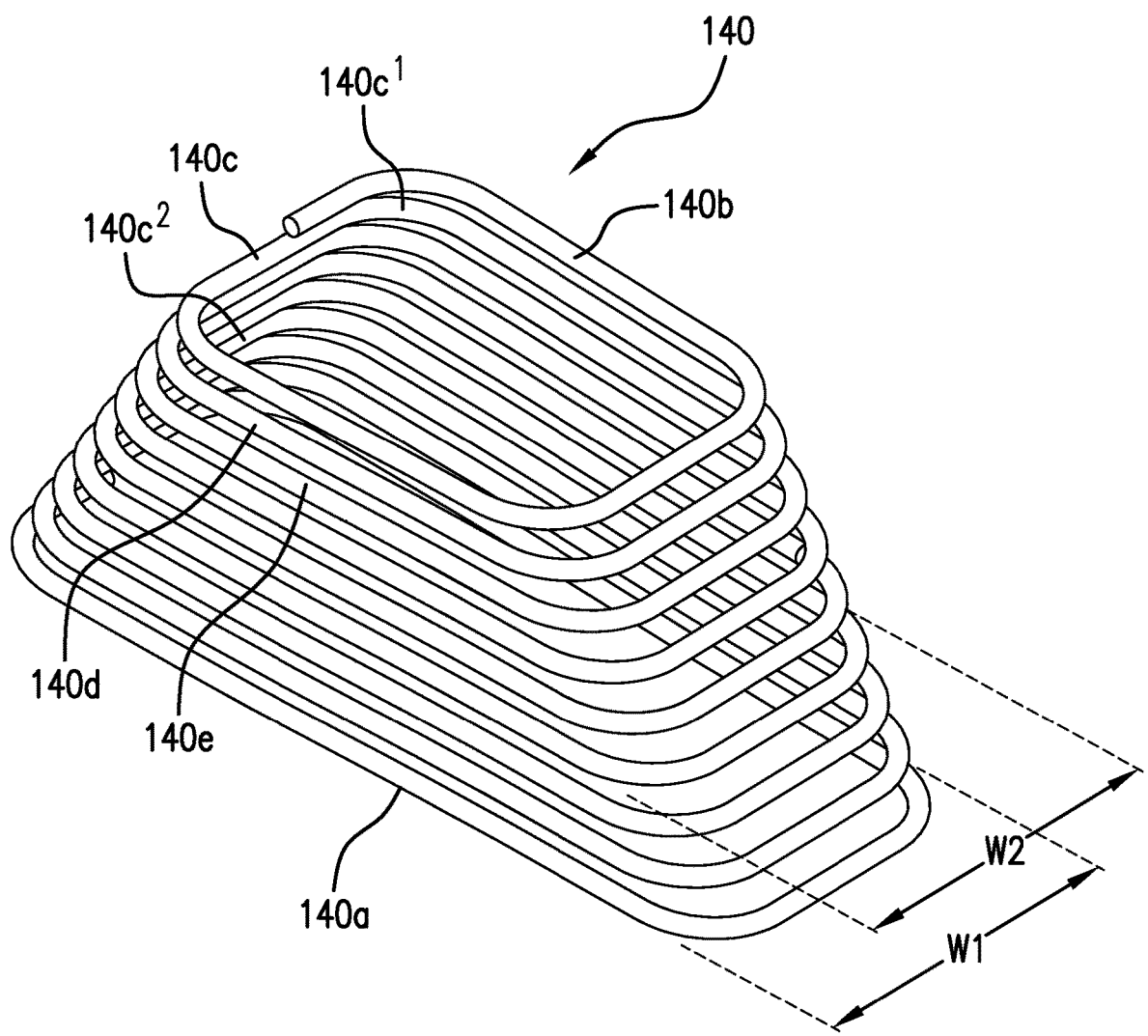
FIG. 9B is a perspective view of the spring of FIG. 9A, shown in a partially compressed condition.

According to a preferred embodiment, the spring 140, as shown in FIGS. 9A and 9B, preferably comprises a coil spring, and has substantially rectangular segments (see for example, segments 140*c*, 140*d*, 140*e* of FIG. 9A). The substantially rectangular segments 140*c*, 140*d*, 140*e*, are shown with radiused corners (see e.g., 140*c*1, 140*c*2). The spring 140 is shown being larger at the top and smaller from the top 140*a* to the bottom 140*b* of the spring 140 over the span of the spring 140. According to some embodiments, and as shown in the exemplary embodiment illustrated, the spring 140 may have a uniform width dimension w1, which may be uniform over the length of the spring 140 (as shown by w2, where w1=w2).

Figure 3A:
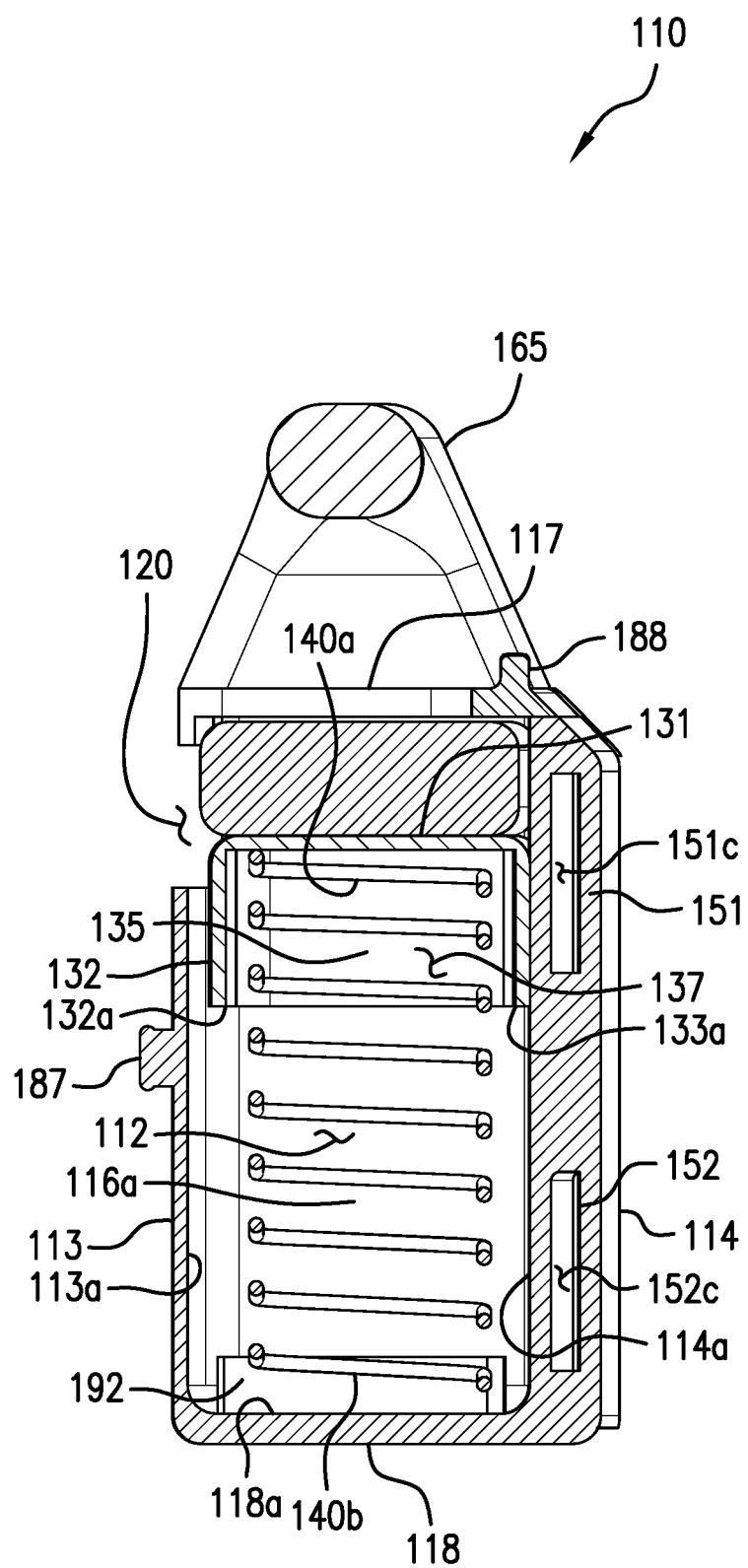
FIG. 3A is a sectional view of the device of FIG. 1, taken along the section line 3A-3A of FIG. 2, shown with the spring in a first biasing condition.
Figure 5A:
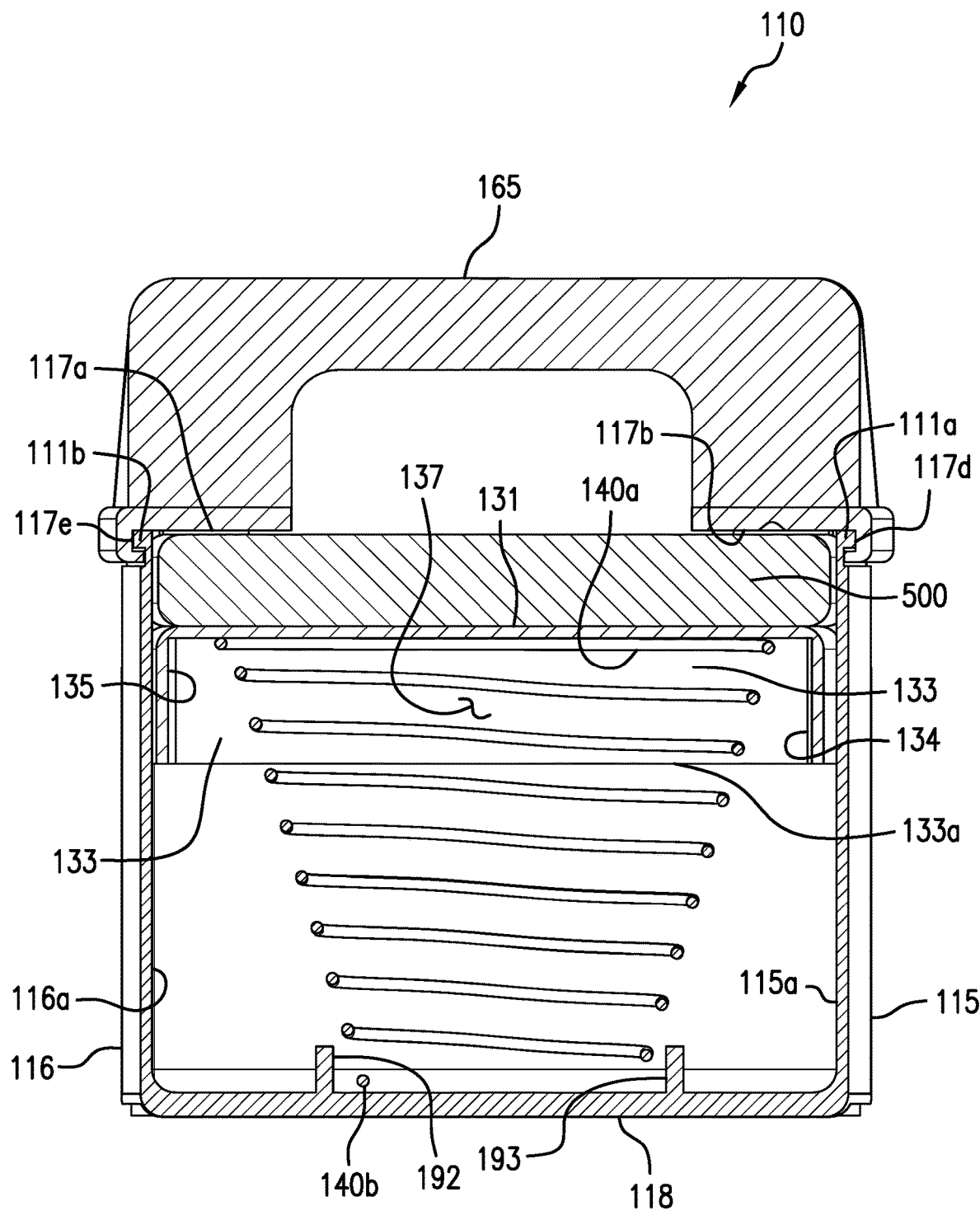
FIG. 5A is a sectional view of the device of FIG. 1, taken along the section line 5A-5A of FIG. 4, shown with the spring in a first biasing condition, corresponding to the spring condition in FIG. 3A.

Referring to FIGS. 3A and 5A, the body cavity 112 is shown having an interior surface, which in the embodiment illustrated comprises the interior of the body walls. The cavity 112 is defined in part by a first interior side wall 115*a* of the first side wall 115, a second interior side wall 116*a* of the second side wall 116, the interior front wall 113*a*, and the interior rear wall 114*a*. An interior bottom wall 118*a* also defines the bottom of the cavity 112. The device 110 has a dispensing opening 120 which is provided at the top of the front wall 113. The dispensing opening 120 in the embodiment illustrated faces the front of the device, and is shown formed in part by the top 117 of the device 110.

Figure 5B:
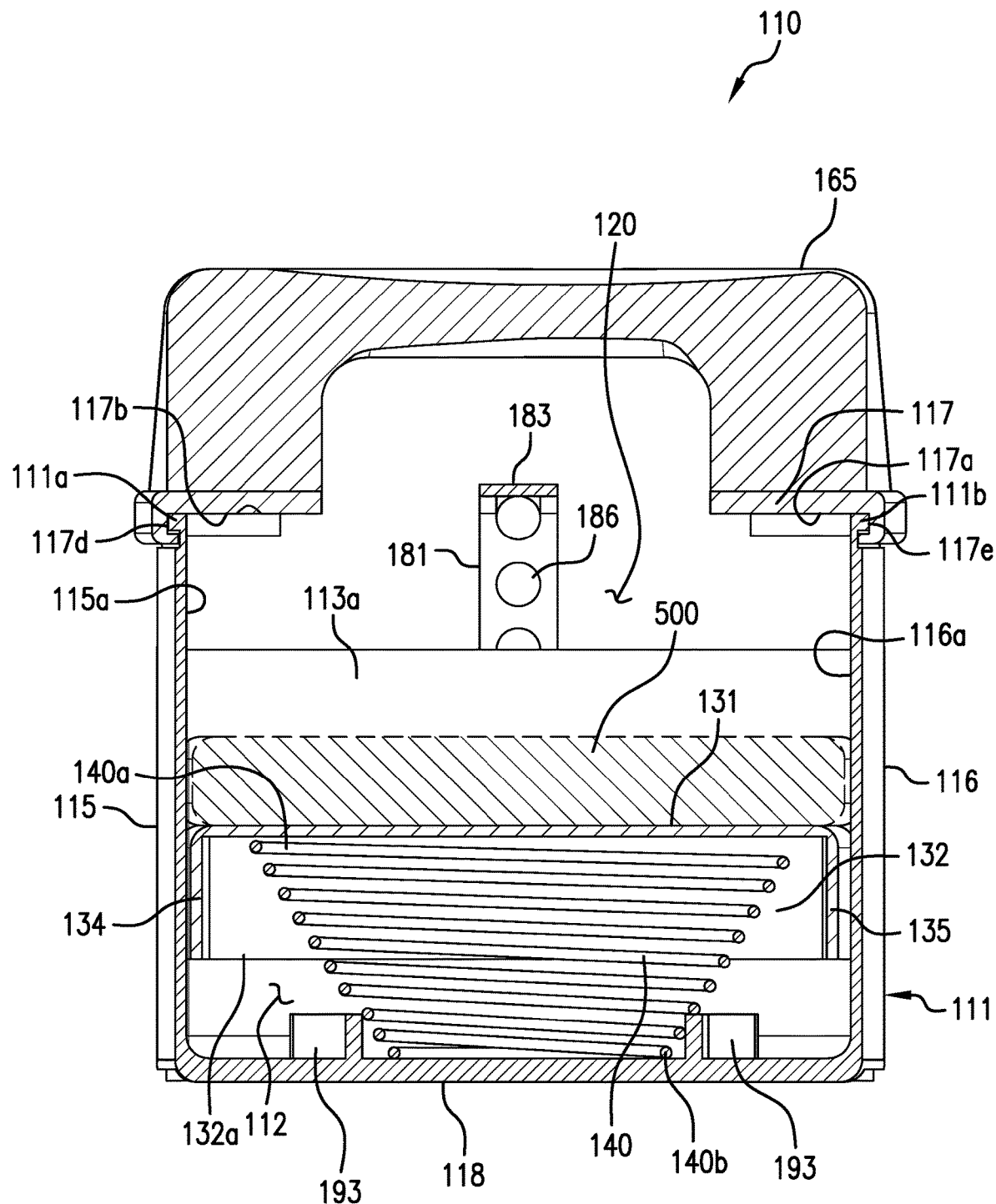
FIG. 5B is a sectional view of the device of FIG. 5A, shown with the spring in a second biasing condition, corresponding to the spring condition in FIG. 3B.

The device 110 has a supporting structure comprising a platform 131, which is illustrated being situated in the cavity 112. The platform 131 is dimensioned and sized to support magazines 500 thereon. The platform preferably includes a front flange 132 which covers the front opening, which is the dispensing opening 120, when the platform 131 is raised to its upper most biased position (for example, where the last magazine 500 has been dispensed from the device 110). The platform 131 may be in this upper position for example when there are no magazines 500 in the device 110 (e.g., when the contents of stored magazines have been dispensed from the device 110). As shown in FIGS. 5A and 5B, the top 117 of the device 110 preferably has wall portions, such as for example, those wall portions 117*a*, 117*b*, that provide a surface against which the biased magazines 500, and the platform 131 (when the device is empty of magazines) may engage. The wall portions 117*a*,117*b* are shown comprising surfaces above the dispensing opening 120. Although not shown, a shock absorber, such as a foam or rubber piece may be provided on the surfaces of the wall portions 117*a*, 117*b* to cushion as well as facilitate retention of the magazines 500 (or the platform 131) that is biased toward engagement with the wall portions 117*a*, 117*b*. The top 117 also is shown having a rear portion that is shown as a rear flange 117*c* (see FIGS. 2A, 2B, 5A, 5B, 7 and 8B) that extends inwardly from the rear wall 114 to partially cover the upper open area to provide a rear stop for the magazine 500 (see FIG. 2A).

Figure 2B:
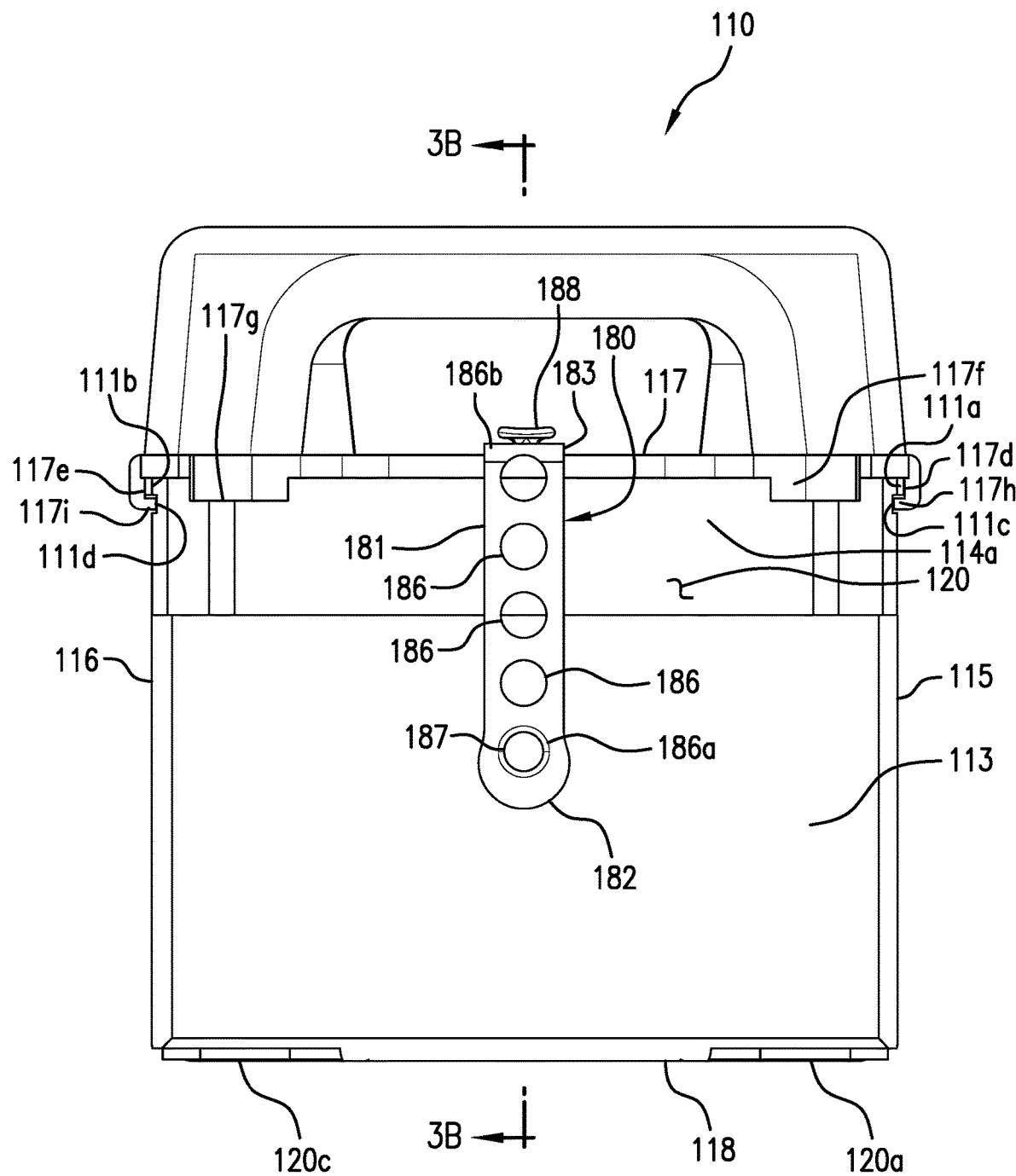
FIG. 2B is a front elevation view of the device of FIG. 1 shown with a magazine loaded in the device, and being shown with the spring in a second biasing condition.

Referring to FIGS. 1, 2A and 2B, the top wall 117 also is shown having fingers 117*f*, 117*g*, which are disposed downward to cover a portion of the dispensing opening 120. Referring to FIG. 2A, the fingers 117*f*, 117*g* are shown positioned to secure the magazine 500 from forward movement. The fingers 117*f*, 117*g* according to preferred embodiments may be provided with the top 117. Alternatively, the fingers may be separately provided or provided as part of another component, such as the body 111.

The platform front flange 132 guards the front space between the front wall 113 and the cavity 112 to block or minimize debris and other material from entering into the cavity 112. Preferably, the platform 131 may contain additional flanges or extensions of the front flange 132, such that each side of the platform 131 has a flange extending downwardly therefrom. According to preferred embodiments, the additional flanges or extensions preferably are lateral or perimetrically located. The platform 131 preferably is dimensioned and shaped to correspond with the profile of the magazine 500 (e.g., such as the magazine perimeter or perimeter of the largest magazine to be accepted within the device 110). The front flange 132 may be coextensive with flanges provided on the sides and rear, such as the rear flange 133, first side flange 134 and second side flange 135. The flanges 132, 133, 134, 135 preferably form a containment such as a cup or tray-like structure that holds the upper portion of the spring 140, and guides the spring 140 by capturing a portion of the spring 140 within the containment space 137 (FIGS. 3A and 5A) defined by the flanges 132, 133, 134, 135. The flange 132 preferably is a solid structure or suitably solid to prevent objects and debris from entering into the cavity space 120 when the last magazine 500 is ready to be dispensed or has been dispensed (and the platform 131 has reached the top of the cavity 112 through the biasing action of the spring 140). Although shown as continuous walls, alternatively, the side flanges 134, 135, and rear flange 133 may be portional structures, which means that they may not be solid or continuous but may comprise fingers or wall segments. In embodiments where the rear flange 133 is portional, the rear flange 133 preferably has at least some portions that are co-extensive in length with the front flange 132, so that the platform 131 is seated at a level position when a capacity of magazines is loaded into the device 110, and the platform 131 has been lowered within the cavity 112 where the flange edges 132*a*, 133*a* (see e.g., FIG. 3B) engage the device bottom 118, such as the lower interior bottom surface 118*a*. The flange edges 132*a*, 133*a* (and other flange edges) may rest on the bottom surface 118*a*. Alternatively, although not shown, the device 110, according to some alternate embodiments, may be constructed with a raised edge at the bottom of the device for the flanges to rest on (when lowered).

According to preferred embodiments, the platform flanges 132, 133, 134, 135 may be coextensive in length to provide suitable balance to the spring 140 and contents as the magazines 500 are loaded into and/or are dispensed from the device 110.

The platform containment space 137 (FIGS. 3A and 5A) preferably captures the larger portion or footprint 140a of the spring 140, and as the spring 140 is compressed (when magazines 500 are loaded into the device 110), the upper portion of the spring 140a takes up residence in the flange space 137 (FIGS. 3B and 5B), with the additional turns of the spring 140 having a smaller footprint, (which preferably is decreasingly smaller from top to bottom) and therefore fitting in whole or in part, within the perimeter of the larger or upper spring portion 140a. As the device 110 is being loaded with magazines 500, the platform 131 lowers within the cavity 112 and continues to compresses the spring 140 (see e.g., FIGS. 3B and 5B, where the platform 131 is being lowered to compress the spring 140). When the device 110 is fully loaded with a complement of magazines 500, the platform 131 is lowered to the bottom of the cavity 112 of the device 110. The platform flanges 132, 133, 134, 135, or portions thereof, contain the spring 140, and retain or aid in the retention of the spring 140 form as the spring 140 is compressed. Although not fully compressed in FIGS. 3B and 5B, the spring 140 is being compressed from its position in FIGS. 3A and 5A).

Figure 3B:
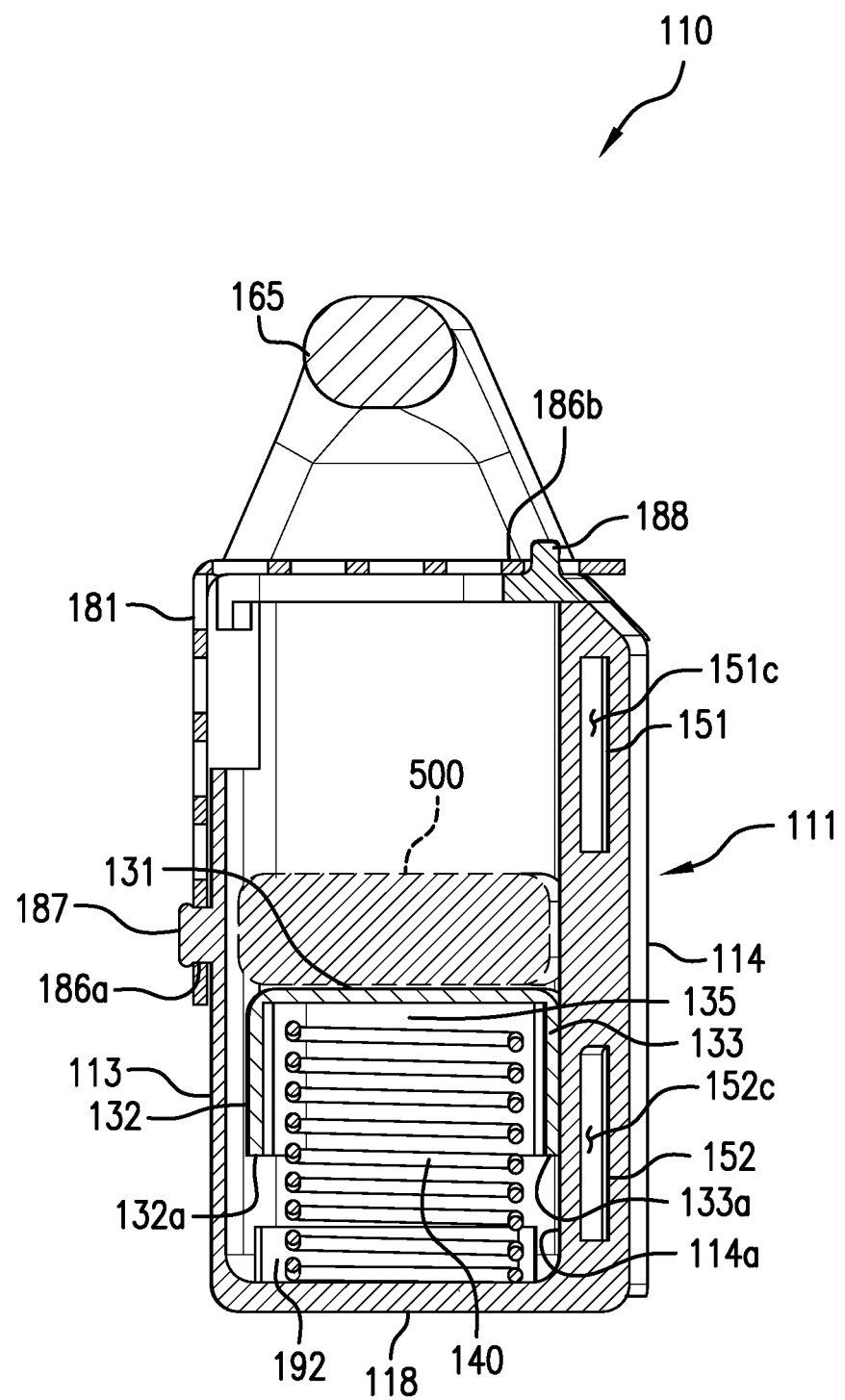
FIG. 3B is a sectional view of the device of FIG. 3A, shown with the spring in a second biasing condition.
Figure 6C:
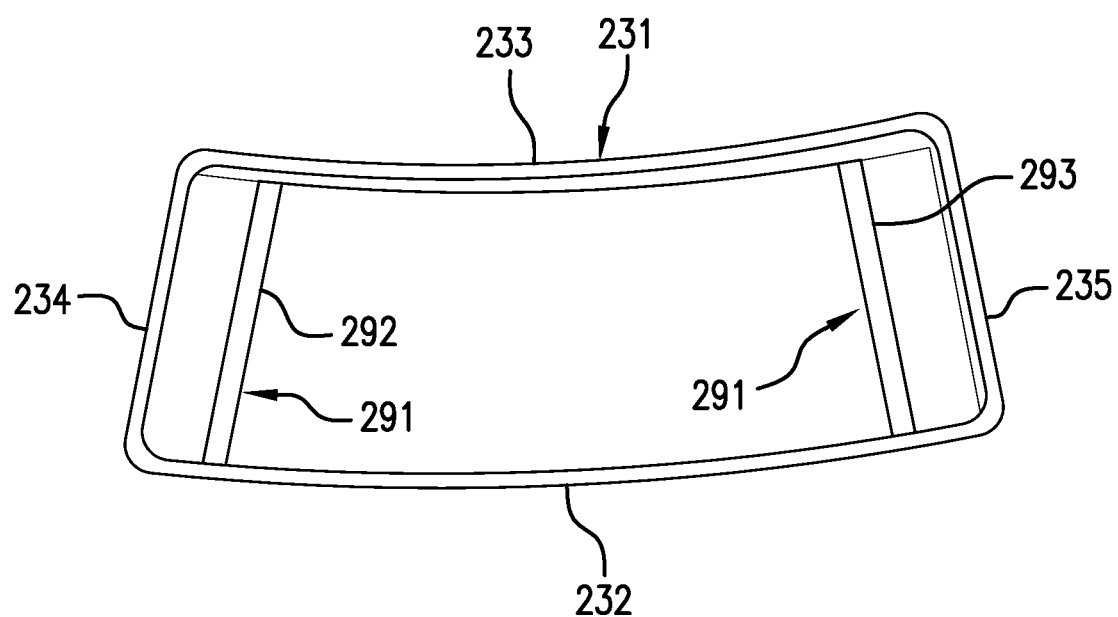
FIG. 6C is an alternate embodiment of a platform shown having a spring retaining feature.
Figure 6D:
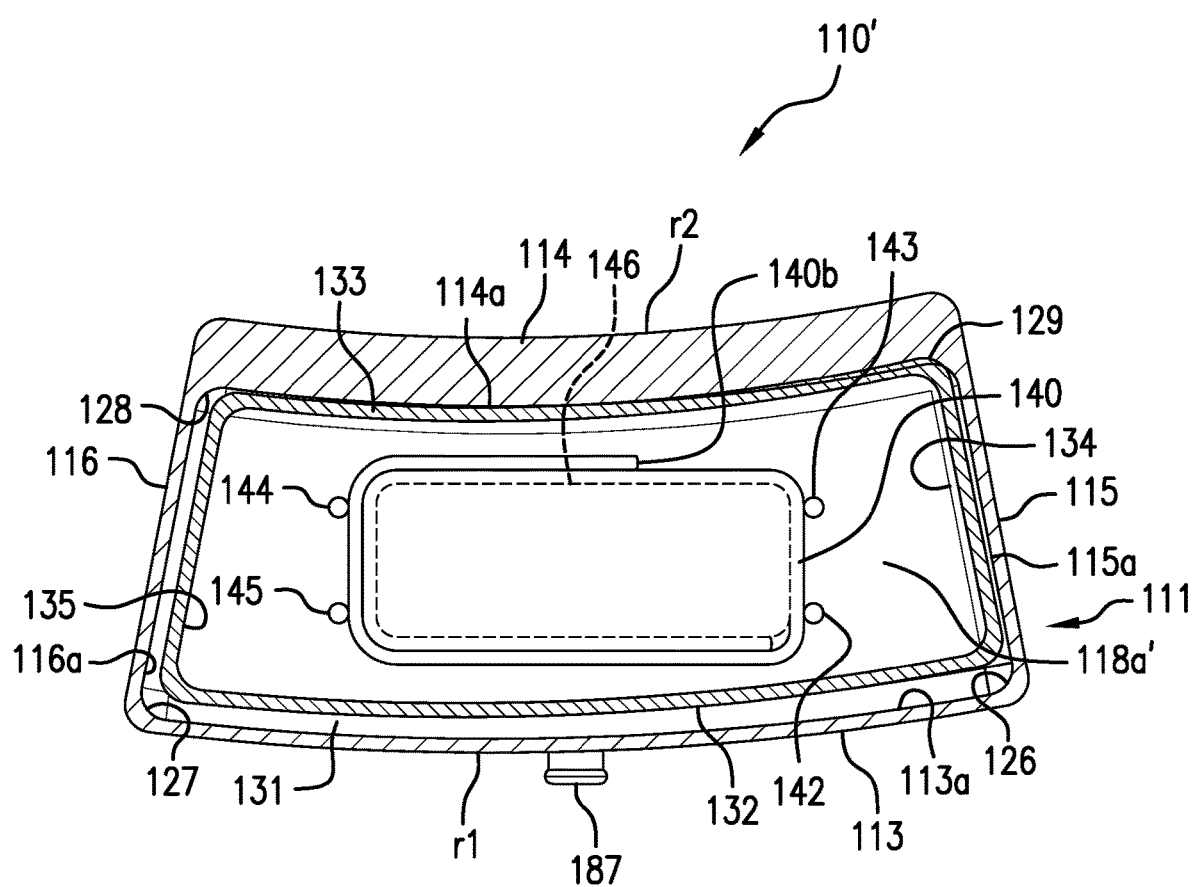
FIG. 6D is a sectional view similar to the view in FIG. 6A, but showing an alternate embodiment of a spring guide.
Figure 7:
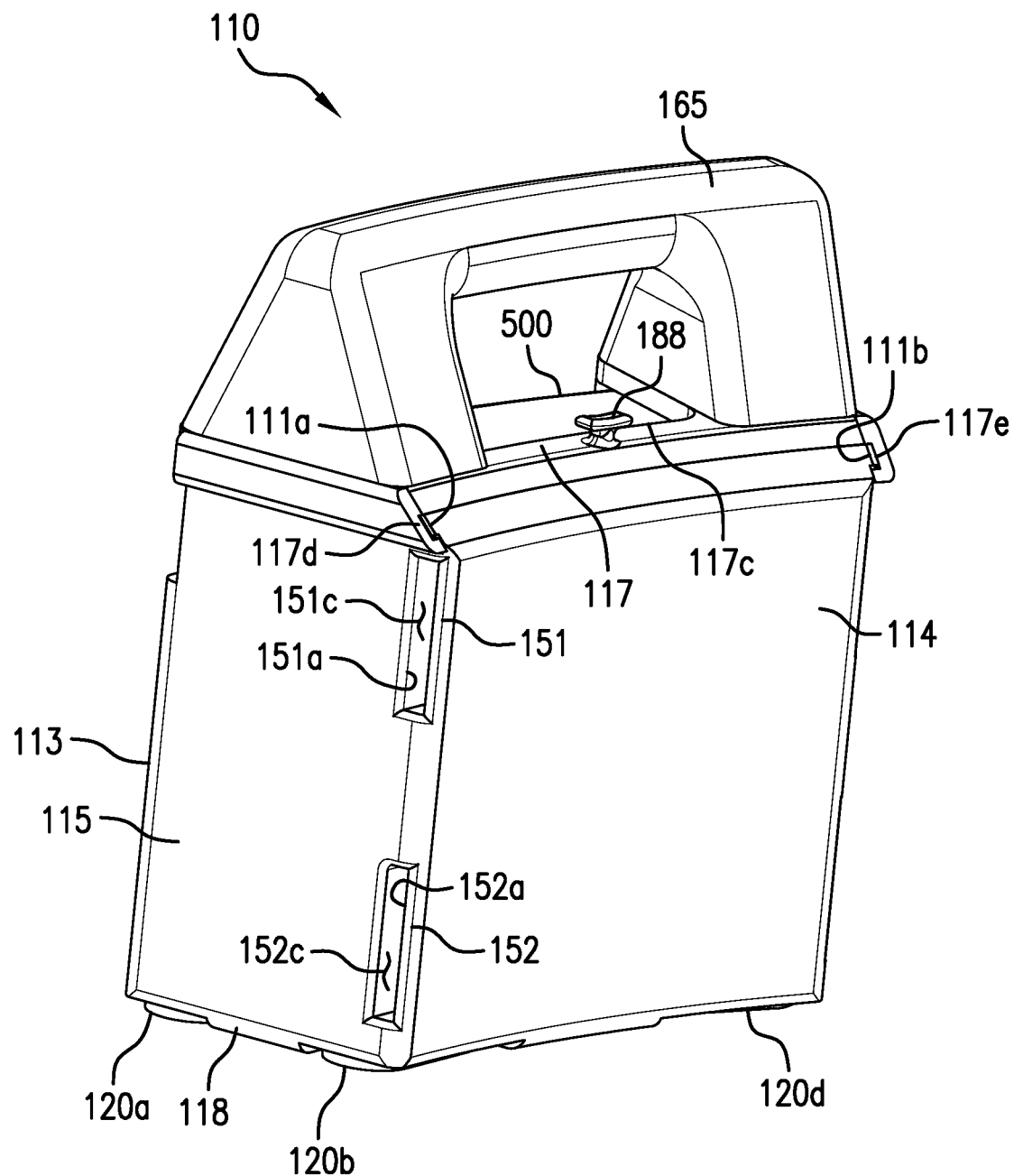
FIG. 7 is a rear perspective view of the device of FIG. 1.

According to preferred embodiments, the bottom interior of the device 110 is provided with a spring guide for aligning the spring and maintaining the spring position during use of the device 110. Referring to FIG. 6D, an alternate embodiment of a spring guide is shown comprising a plurality of posts 142, 143, 144, 145 arranged on the bottom 118' of the device 110. The device 110' shown in FIG. 6D is the same as the device 110 shown and described in the other figures, except for the bottom, which is referenced as 118', which contains the posts 142, 143, 144, 145. The spring guide 141 preferably is positioned to define a location for the smaller end 140b of the spring 140. When the spring 140 is being collapsed and under compression due to the magazines 500 being loaded into the device 110' (i.e., one or more magazines 500), the spring 140 receives a force load. The force load is absorbed by the spring 140 and transferred through the spring 140. The lower portion of the spring 140b, according to the preferred embodiment, has a smaller footprint 140b. The spring guide 141 is designed to hold the smaller spring portion (spring end 140b), and prevent the spring end 140b from sliding or buckling when it receives loading and is being compressed (as is depicted in FIGS. 3B and 5B).

As illustrated in FIG. 6D, the spring guide 141, according to the alternate embodiment, is shown comprising posts 142, 143, 144, 145 protruding from the bottom of the device 110. The posts 142, 143, 144, 145 are shown being spaced apart and preferably, define a space or area within which the lower spring end 140b is located. The spring guide 141, shown configured as the posts 142, 143, 144, 145, forms a boundary 146 (FIG. 6) within which the lower spring portion 140b or footprint may reside. The posts 142, 143, 144, 145 prevent or minimize shifting of the lower end 140b of the spring 140 when the force load is applied and/or received. According to some embodiments, the posts 142, 143, 144, 145 may be secured by or comprise the fastening elements, such as, for example, those fasteners 121a, 121b, 121c, 121d shown and described herein (see FIG. 8A) that secure the feet 120a, 120b, 120c, 120d to the device body 111 (or separately provided fasteners).

According to preferred embodiments, the bottom interior of the device 110 is provided with a spring guide for aligning the spring and maintaining the spring position during use of the device 110. The spring guide 191 is shown comprising rails 192, 193 arranged on the bottom 118 of the device 110. The rails 192, 193 are disposed inside the body space 112 and along the interior 118a of the bottom wall 118 of the device 110. The rails 192, 193 are shown spaced apart. The spring guide 191 preferably is positioned to define a location for the smaller end 140b of the spring 140. When the spring 140 is being collapsed and under compression due to the magazines 500 being loaded into the device 110 (i.e., one or more magazines 500), the spring 140 receives a force load. The force load is absorbed by the spring 140 and transferred through the spring 140. The lower portion of the spring 140b, according to the preferred embodiment, has a smaller footprint 140b. The spring guide 191 is designed to hold the smaller spring portion (spring end 140b), and prevent the spring end 140b from sliding or buckling when it receives loading and is being compressed (as is depicted in FIGS. 3B and 5B).

According to a preferred embodiment, the spring guide 191 is shown comprising rails 192, 193. The rails 192, 193 are spaced apart and protrude upwardly from the bottom 118 of the device 110. The rails 192, 193 are shown being spaced apart and preferably, define a space or area within which the lower spring end 140b is located. The spring guide 191, shown comprising the rails 192, 193, forms a boundary 196 (FIG. 6) within which the lower spring portion 140b or footprint may reside. The boundary 196 preferably also may be formed on sides transverse to the rails 192, 193, by the front wall 113 and rear wall 114 of the device 110, and more particularly the respective interior wall surfaces 113a, 114b. The rails 192, 193 prevent or minimize shifting of the lower end 140b of the spring 140 when the force load is applied and/or received. Preferably, the rails 192, 193 are configured to accommodate the platform deflection when the platform 131 is lowered. According to the exemplary embodiment shown, the rails 192, 193 are provided with ends 192a, 192b and 193a, 193b, respectively, that are spaced apart from the interior walls 113a, 114a, to provide clearance for the front and rear platform flanges 132, 133, respectively, to seat on the bottom 118 of the device. Alternatively, according to other embodiments, the rails (such as those rails 192, 193) may extend to each wall 113, 114 (e.g., touching each wall), and cut-outs may be provided in the platform flanges 132, 133 to receive the rails 192, 193, or to allow for their presence when the platform 131 is lowered. The rails 192, 193 preferably may be molded as part of the device 110 (e.g., the device bottom portion or body 111). Alternatively, the rails 192, 193 may be separately provided, and may be secured with suitable fastening elements or adhesive.

According to some embodiments, the platform 131 also may be provided with a guide or holding elements to hold or guide the upper portion 140a of the spring 140.

According to some embodiments, the platform 131 may include a spring guide that situates the upper portion 140a of the spring 140 at a location within the platform 131. According to an alternate embodiment, a platform 231 is shown in FIG. 6C, separate from the other components. The platform 231 is similar to the platform 131, and has a front flange 232, a rear flange 233, and two side flanges 234, 235. The platform 231 is shown with a spring guide 291, according to an exemplary embodiment, comprising rails 292, 293, provided on the underside 231a thereof. The platform 231 may be configured similar to the platform 131 shown and described herein, including any of the features or variations thereof, but with a spring guide 291, such as the rails 292, 293 provided on the underside 231a of the platform 231. The rails 292, 293 may extend between the platform front and rear flanges 232, 233. Alternatively, the rails 292, 293 may be provided in a discontinuous form or may be provided continuously between the front flange 232 and the rear flange 233.

Figure 10:
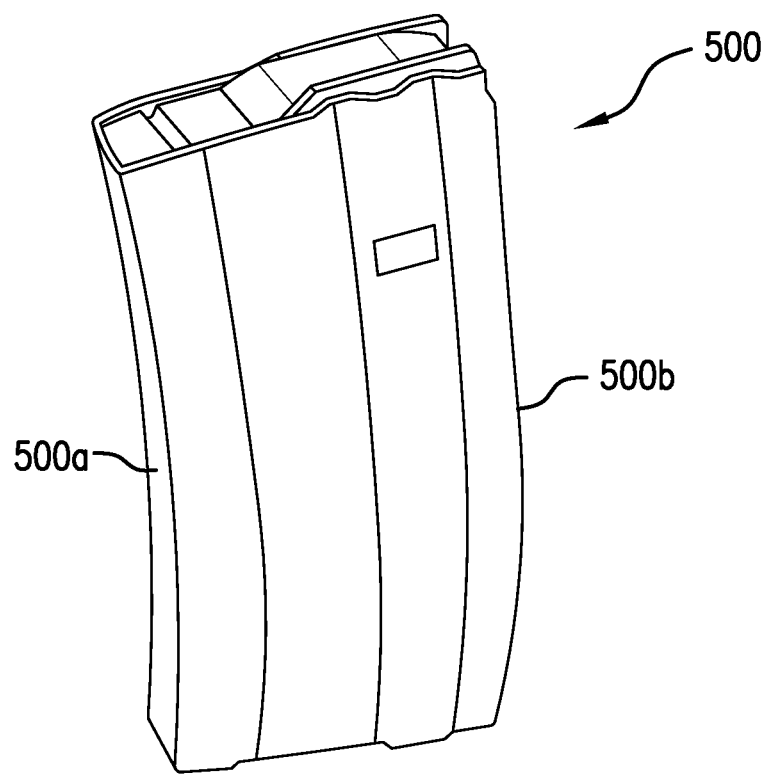
FIG. 10 is a perspective view of an example of a magazine that may be used with the devices depicted herein.

As shown in FIG. 10, an example of a magazine 500 that contains firearm cartridges is shown. Although magazines may have different dimensions and curvatures, or configurations, the device 110 preferably is provided with walls that match the profile of the magazine type to be carried therein. The profile of the magazine 500 in FIG. 10 is curved. As shown in the perspective views of FIGS. 1 and 7, and the sectional view of FIG. 6, the device 110 has a sectional profile showing the cavity 112 having a shape matching the profile of the magazine 500, so that the magazine 500 may be securely held in the device 110.

As shown in FIG. 6, the device 110 has a first or outer radial profile (r1) and a second or inner radial profile portion (r2). In the embodiment of the device 110 illustrated, the cavity 112 has a radial configuration. The interior device walls, e.g., the front interior wall 113a, the rear interior wall 114a, the first side interior wall 115a, the second side interior wall 116a, preferably have following edges at the vertical intersections thereof, which preferably are curved to facilitate sliding of the magazines 500 within the device 110, both when loading, and when magazines 500 are dispensed from the device 110. These vertically disposed curved or radiused edges, according to preferred embodiments, comprise a means to reduce binding and friction of the platform 131 and the magazines 500 as the magazines move within the chamber 120 of the device 110, such as when the magazines 500 are being loaded into the device 110 and/or when they are being dispensed therefrom, as well as when the device 110 and contents (e.g., magazines 500) are agitated (e.g., during transport). As illustrated in the sectional views, and being shown in particular in FIG. 6, the front interior wall 113 forms vertical intersections 126, 127 (at the front of the device 110), respectively, with the first interior side wall 115a, and second interior side wall 116a, and the rear interior wall 114a also forms additional vertical intersections 128, 129 (at the rear of the device 110) with the first interior side wall 115a, and second interior side wall 116a. The vertical intersections 126, 127, 128, 129 preferably extend the length of travel of the magazine path 130 within the cavity 112, and have a curved or radiused edge forming vertical slide channels at each corner of the interior cavity 112. As shown in FIG. 6, the curved or radiused edges of the vertical intersections or slide channels 126, 127, 128, 129 are designed to facilitate guiding and deflection of the magazines 500 that may come into contact therewith, as well as of the platform 131 and the platform flanges 132, 133, 134, 135 that may engage these channels as the platform moves along the cavity 112.

Referring again to FIGS. 1, 6 and 7, the embodiment of the device 110 preferably has a curved front wall 113 and curved rear wall 114. In the embodiment depicted, the front wall 113 is larger than the rear wall 114. The side walls 115, 116, in the exemplary embodiment illustrated, are straight, and connect the front wall 113 with the rear wall 114. The magazines 500 are designed to be released from the front of the device 110, through the dispensing opening 120. In the device embodiment 110 illustrated, a magazine 500 is inserted into and released from the device 110 with the shorter walled portion 500a of the magazine 500 entering the opening first, and the larger walled portion 500b trailing, and upon dispensing, the larger walled portion 500b is released first from the opening 120 with the smaller walled portion 500a trailing. Magazines 500 may be removed, and if not needed may be replaced by inserting the magazine 500 back into the device 110. According to some alternate embodiments, the device walls may be configured to be flat, and the body rectangular in shape. These alternate embodiments may include some or all of the features discussed herein in connection with the device 110. The rectangular body may receive rectangular magazines therein, and may receive curved magazines that fit within the body space (e.g., when placed into the dispensing opening). In the embodiment of the device 110 illustrated, the cavity 112 has a radial configuration, but in some alternate embodiments, the cavity may be provided having a rectangular shape. According to some alternate embodiments, the device cavity may be configured having a rectangular shape or radial shape, and the device exterior may have a shape that is rectangular or radial which is not dependent on the interior cavity shape.

The device 110 is shown having a handle 165 that may be grasped by a user when holding or transporting the device 110. Alternatively, the device 110 may be configured with one or more additional or alternate means for carrying the device 110.

Figure 11:
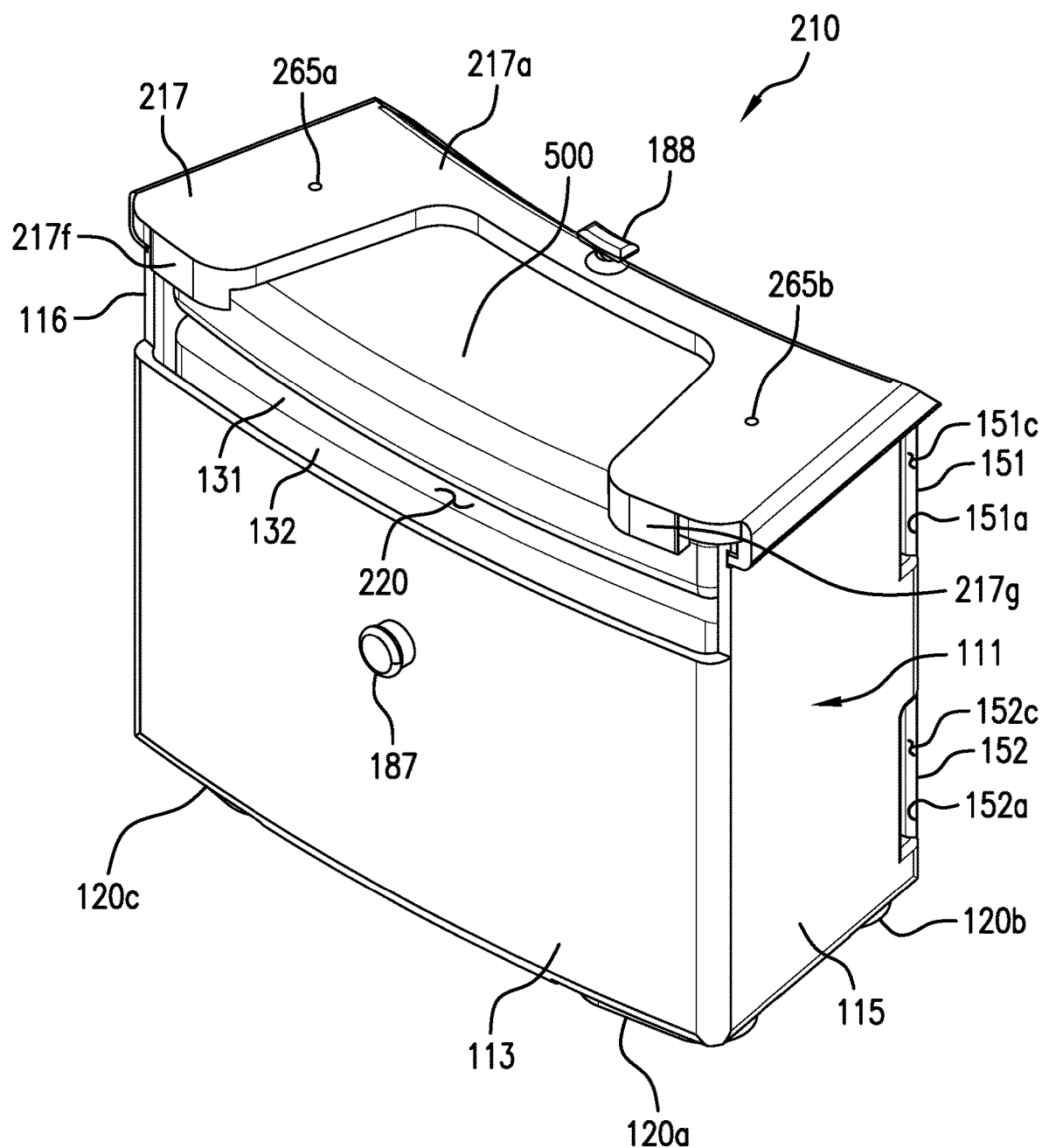
FIG. 11 is an alternate embodiment of a device for holding and dispensing magazines.

According to some alternate embodiments, the device 210 may be configured without a top handle, where the top 217 of the device 210 serves as a stop for the magazines as they are biased upward (if upright, or to the top 217). The top wall 217 is shown having fingers 217f, 217g, which are disposed downward to cover a portion of the dispensing opening 220. As shown in FIG. 11, the device 210 includes a top portion 217. The top portion 217 may attach to the device bottom as shown and described herein in connection with the other devices, such as the device 110 (the elements in FIG. 11 being referenced with the same reference numerals as appear in the device 110 of FIGS. 1 through 8B). The top portion 217 preferably is shown without the handle 165 (shown with the device 110), and the top portion 217 preferably may be installed on the body 211 in the manner shown and described in connection with the device 110 and the body 111 and top 117. Although the handle structure 117 is not provided, according to some versions, the device 210 may include a portion that may be grasped, which may remain flat or substantially flat (against the top surface 217a). The device 217 may be used in connection with any of the uses of the device 110, and may be carried in a bag, such as the bag shown and described herein, where the bag has a handle.

According to some alternate embodiments, the device, such as, for example, the devices 110, and 210, may be provided with a handle configured as a strap that installs onto the device (e.g., 110, 210). As illustrated in the exemplary embodiment shown in FIG. 11, the device 210 is shown having two mounting locations thereon, comprising bores 265a, 265b. An optional strap (not shown) may be installed to the device 210 by mounting it with mounting hardware, such as, for example screws, pins or other fasteners, to the bores 265a, 265b.

According to some alternate embodiments, the device 110 or 210 may be provided with a mounting mechanism which preferably is designed to secure the device 110 or 210 to a structure (such as a vehicle interior or exterior), or to a person's body, via a person's clothing (such as, for example, an outdoorsman's vest, or combat vest).

The mounting mechanism may be provided to afford mounting in a number of ways, including a side mounted embodiment where the device, such as is shown in connection with the device 110, may be mounted to the side of a user (or user's clothing), a chest mounted version for mounting on the user's chest (or clothing), a wall mounting embodiment that may be mounted to a wall or other wall-like structure (e.g., a combat vehicle, tank or police vehicle), and a back mounted version that may be mounted on the back of a user (or user's clothing), for access by the user, or by others working with the user (trailing team members).

According to a preferred embodiment, the device 110 is shown with an exemplary configuration in accordance with a preferred embodiment. The mounting mechanism 150 includes a mounting structure that is located on the device 110. As shown in the exemplary embodiment in FIGS. 1, 3A, 3B, 4 and 7, the device 110 includes a mounting mechanism 150 that is configured to receive a band there through, such as, for mounting to a belt or band of the user's clothing. The mounting mechanism 150 is shown having a first pass through slot 151, and preferably a plurality of slots, such as, the second slot 152 (or other slots), which are situated to provide alternatives for attaching the device 110 e.g., to the user or user's clothing (for example, at different heights, locations or levels, etc.). The slots 151, 152 preferably may be integral with one or more of the device walls, such as, for example, the rear wall 114 as shown (or one or more other walls, or on a plurality of walls). The slots 151, 152, each contain a first opening 151a, 152a, respectively, and a second opening 151b, 152b, defining a channel 151c, 152c, respectively between each of the respective openings 151a, 152a and 151b, 152b, through which a belt, band or other element may be passed. For example, the slots 151, 152 may be provided to receive a belt therethrough so that the device 110 may be held on the user's waist (or proximal to waist level), at a location along the user's belt. In addition, a plurality of devices may be attached to a user's belt (e.g., one on each side, the back, or sides and back, or front or combinations of these locations). The belt slots 151, 152 may be provided in a recessed portion of the device 110, or within the thickness of the device wall, such as the rear wall 114. For example, although the slots 151, 152 are shown provided in the rear wall 114, they also may be provided in another wall, such as one or both side walls 114, 116, or side walls 115, 116 and rear wall 114, or as well as the front wall 113, or combinations thereof. As illustrated in the figures, the recessed thickness and rear wall 114 (e.g., when the slots 151, 152 are provided on the rear of the device 110) preferably is provided having a suitable dimension or depth so as not to interfere with the stacked magazines 500 contained within the device cavity 112. As shown according to a preferred embodiment, the slots 151, 152 are provided in the rear wall 114 of the device 110. The embodiment of the device 110 shown in FIGS. 1, 3A, 3B, 4 and 7, locates the slots 151, 152 within the thickness of the wall 114.

Alternatively, the mounting mechanism may be configured as a belt passage or mounting bar that protrudes from a wall of the device 110, or may be partially protruding from a wall and partially recessed. For example, according to some embodiments, belt slots may be provided on an exterior wall of the device, and in other embodiments may be within the wall, as well as on the device exterior, or both.

Figure 12:
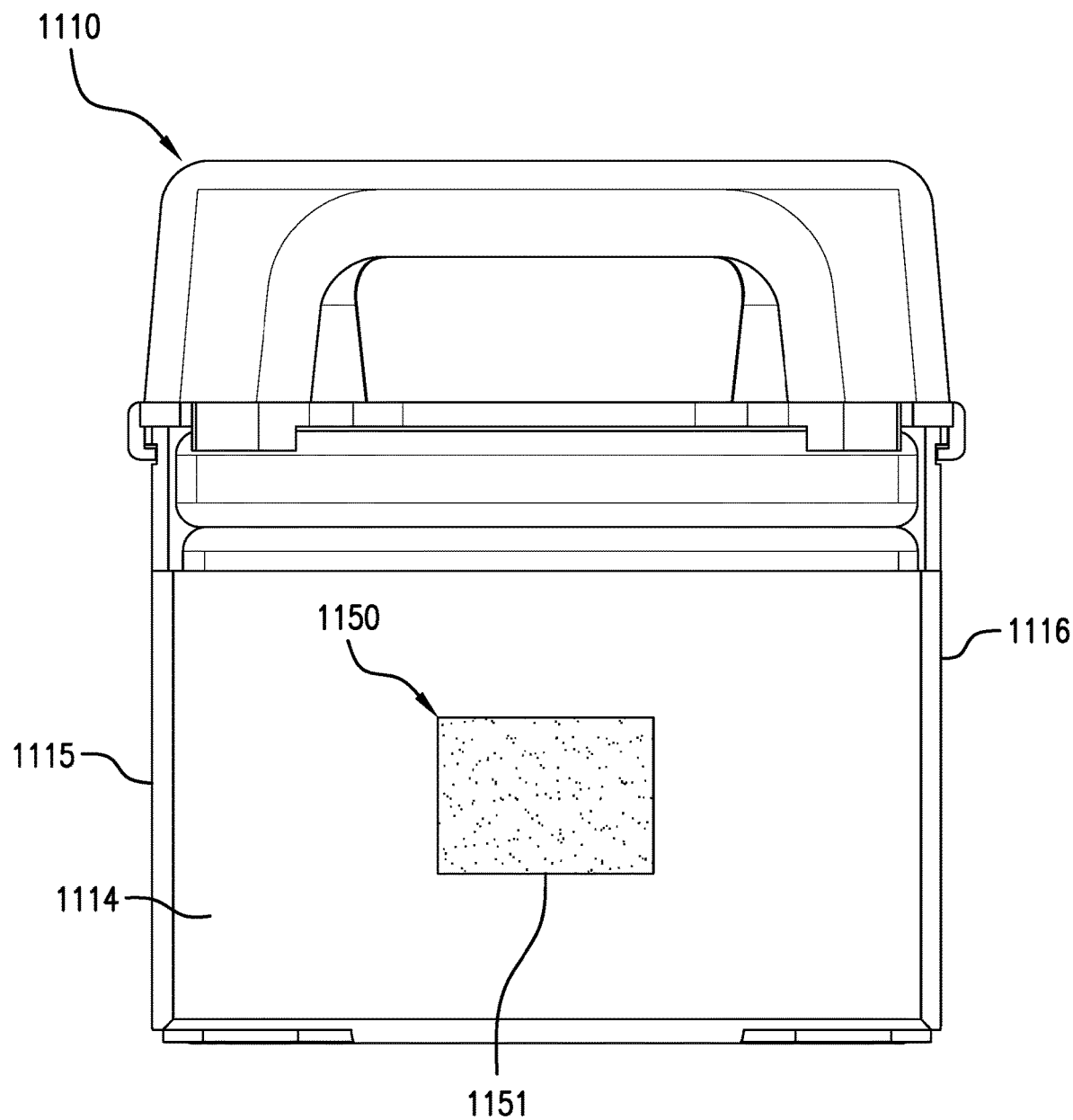
FIG. 12 is an alternate embodiment of a device shown having an alternate mounting means.
Figure 13A:
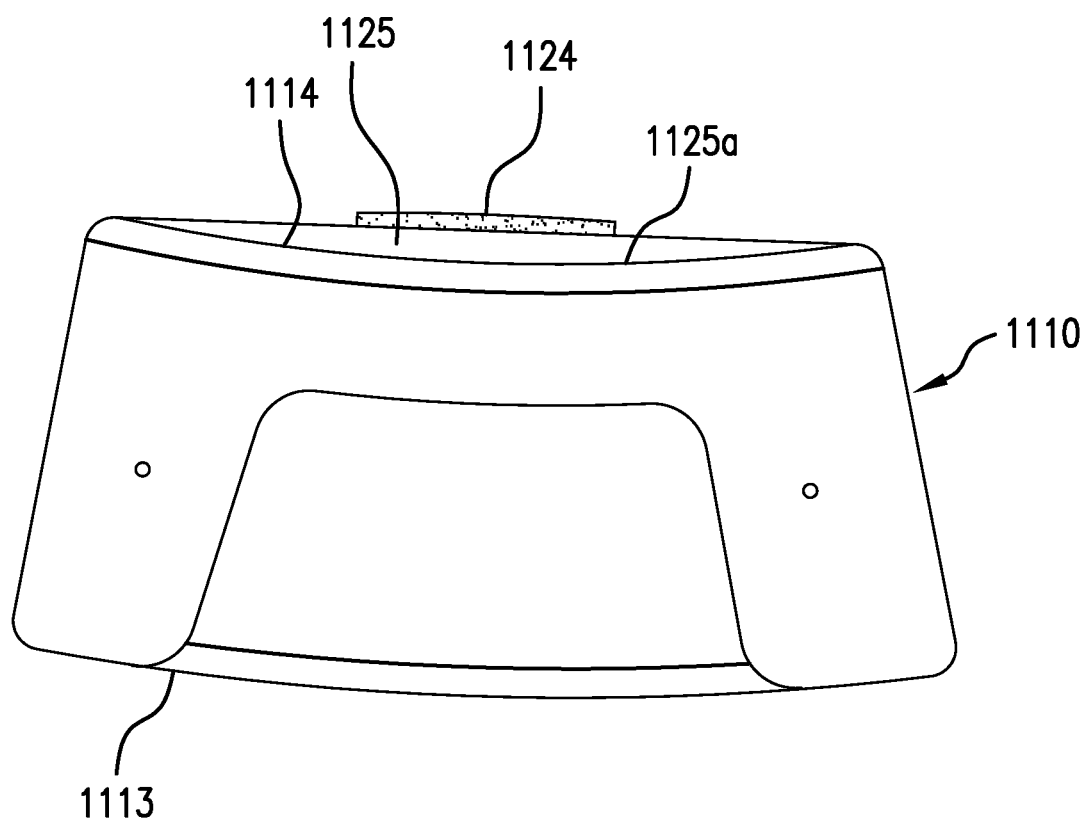
FIG. 13A is a top plan view of the alternate embodiment of the device of FIG. 12.
Figure 13B:
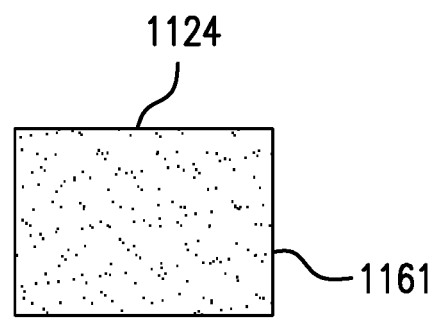
FIG. 13B is a separate view of a plate that may be used with the devices, shown separate from the other portions of the device of FIGS. 12 and 13A.
Figure 14:
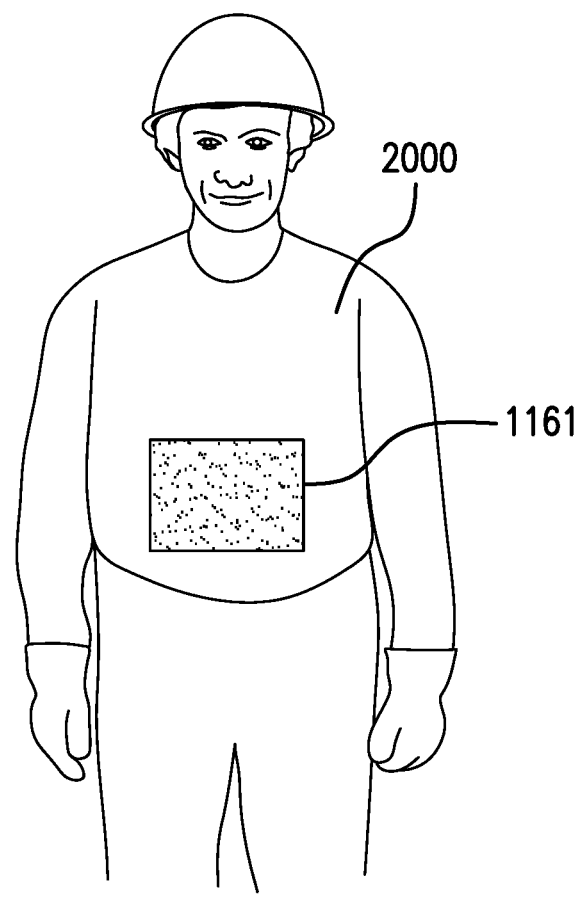
FIG. 14 is a perspective view of a vest showing an exemplary mounting structure to which the devices may attach.

According to an alternate embodiment, referring to FIGS. 12 and 13, an embodiment of a device is represented by reference 1110, which is similar in respects to the device 110 shown and described herein. The device 1110 is shown configured with a mounting mechanism 1150 that includes a first mounting structure 1151 located on the device 1110. The device 1110 may include the belt slot or slots (151, 152) shown and described in connection with the device 110, or may include only the alternate mounting mechanism 1150, or according to some embodiments may include both one or more slots (such as those 151, 152, or others in other locations or walls) and a mounting structure 1151. According to one embodiment, the mounting mechanism 1150 may include a first mounting structure 1151 attached to a wall of the device 1150, such as, for example, the rear wall 1114, first side wall 1115 or second side wall 1116. The first mounting structure 1151 may be integral with the device 1110 or may be removably attachable to the device 1110. According to some embodiments the mounting mechanism 1150 may include a mating structure, such as, for example, a second mounting structure 1161 (FIG. 13B) that is attachable to or carried on the user. In the example depicted in FIG. 14, the user is shown wearing a vest 2000. The second mounting structure 1161 is shown attached to the user's vest 2000. The first mounting structure 1151 is attachable to a mating structure, such as the second mounting structure 1161 to releasably secure the device 1110 to an object, such as, for example, the vest 2000, and remove the device therefrom as needed (e.g., for reloading, or when the magazines have been dispensed). The second mounting structure 1161 preferably is designed to releasably secure with the device 1110 or a mounting structure of the device 1110, such as the first mounting structure 1151. The second mounting structure 1161 may be attached to an object, such as for example, the vest 2000, using a suitable fastener, which may include stitching or sewing, adhesive, clips, pins, rivets, or other connecting elements.

Preferably, the mounting mechanism 1150 allows for rapid removal and attachment of the magazine holding and dispensing device 1110 (or the device 110, or other devices according to the invention) to a surface or structure, such as a combat vehicle, or to the clothing of a user, or a band or belt worn by a user. The first mounting structure 1151 and second mounting structure 1161 preferably may comprise matingly attachable surfaces of hooks and loops, such as Velcro® surfaces, where one of the first or second mounting structures 1151, 1161 has a surface of hooks and the other a surface of loops. Alternatively, other structures that allow attachment of the device 1110 by placing it near or on a mounting location may be used. For example, where a user, such as combat personnel or an outdoor enthusiast, needs to rapidly secure one or more pre-loaded magazine dispensers 1110 in position to be carried as part of the user's gear, the mounting mechanism 1150 provides for rapid placement of one or more devices 1110. For example, a plurality of second mounting structures 1161 may be placed at locations on a combat vest or outdoorsman's gear, in the front, at the sides, at the rear, and/or at upper or lower levels, so that the user may attach the pre-loaded magazine devices 1110 to one or more locations, as desired.

The mounting mechanism 1150 may be provided directly on the device wall exterior surface, such as the rear wall exterior surface 1114b, or alternatively, may be raised off of the surface 1114b with a plate 1124 or other suitable riser, to provide a flat or substantially flat surface for facilitating mounting to a flat or substantially flat structure or surface. Alternatively, the plate 1124 may be integrated with the device 1110, such as being part of a device wall, like, for example, the rear wall 1114. According to some embodiments, the wall 1114 has a platform 1125 that extends therefrom to provide a flat mounting surface. Referring to FIG. 13A, the alternative wall structure 1125 is illustrated in a top plan view, showing a raised platform portion 1125. The platform portion 1125 is shown having a wall thickness 1125a but according to alternate embodiments may be solid or partially solid. The platform 1125 may include a mounting structure, such as, for example, a Velcro® surface, or may include belt loops or other mounting element. The surface 1125 may serve as the plate 1124, or alternatively, the plate 1124 may be mounted on the raised surface platform 1125.

The devices according to the invention, such as the devices 110, 210 and 1110, may be configured to be carried within a bag or other structure that contains the device, and allows for ready access to the dispensing slot 120, 220 and to magazines that are dispensed from the device, and makes it easy to attach the device to gear or other objects. The bag may be secured or carried, and the device contained within the bag. A flap or tab may be provided, and may be re-securable after use. The flap may expose the upper portion of the device, or the dispensing opening so as to allow access to the opening to receive magazines being dispensed therefrom.

The device 110, 210, 1110 may be constructed from any suitable material or combination of materials. Preferably the device body 111, 211, 1111 and handle 165, 265 is constructed from plastic, and more preferably from a durable plastic material. For example, according to a preferred construction, the device 110, 210, 1110 is constructed from a polyethylene (PET) or other suitable plastic material, or combinations thereof. The device 110, 210, 1110 also includes a spring 140 and keeper component 180, which may be constructed from materials other than the materials used to form other parts of the device 110, 210, 1110.

According to some embodiments, the device top 117 may be configured to mount onto the device body 111. In these embodiments, the spring 140 (and also the platform 131), may be installed within the body cavity 112 prior to securing the top 117 to the device body 111. According to one embodiment, a connecting mechanism, such as, for example, the rails 111a, 111b may be provided at the upper end of the body 111, on the top of each side wall 115, 116, respectively. As shown in FIGS. 2A, 2B, 5A and 5B the top 117 preferably has a track or groove 117d, 117e provided on each side thereof, which connects with a respective one of the rails 111a, 111b of the body 111 to secure the top 117 to the device 110. The top 117 is positioned so that each track 117d, 117e preferably is aligned with a respective one of the rails 111a, 111b, and slidably moved along the rails 111a, 111b until the top 117 is positioned into place on the device body 111. For example, the top may be attached starting from the rear of the device body 111, and sliding the top 117 forward. The rails 111a, 111b and/or the tracks 117d, 117e, may have a locking element, such as a barb, mating slot or other suitable connecting element to secure the top 117 in place once it has reached the correct position on the body 111. According to a preferred embodiment, the body 111 may include grooves 111c, 111d that receive lower flanges 117h, 117i, respectively, of the top 117 (see FIGS. 2A and 2B). Alternatively, the device 110 may be constructed in other manners, such as, for example, by forming the body via injection molding or other process, and welding the components (such as the top 117 to the body 111), or using a suitable adhesive to connect them. These latter examples also may be used with the track and rail arrangement. According to other embodiments, one or more components of the device 110 may be produced by injection molding, and the spring 140 compressed and installed through the dispensing opening 120.

The device 110 (and devices 210, 1110) may be configured to hold any number of magazines. Since the pre-loaded magazines will carry ammunition, the magazine devices (such as those 110, 210, 1110) may hold as few as two, or many more. Preferably, the number of pre-loaded magazines held by the devices 110, 1110 is between about 3 and 6. The devices may be configured to hold magazines which preferably are held in a stacked arrangement within the device cavity 112 (e.g., of the device 110). Although 3, 4, 5, or 6 magazines may be held, the devices may be provided to hold larger numbers of magazines, such as 8, 16, or 24 magazines. Each magazine preferably has a number of pre-loaded cartridges, such as 5 or 6 per magazine, or 10, or even more, such as 30 in the case of some magazines designed for use with combat weapons or in combat or law enforcement situations. A large number of rounds are thereby made available for use by the user carrying and being able to dispense magazines from the devices as needed.

According to some embodiments, a keeper 180 is provided to secure the dispensing area 120 of the device from accidental ejection of magazines when not desired. For example, where the device is carried on a user, and there is rough terrain or turbulence experienced, or where the magazine is struck by an object (other gear, etc.), the keeper 180 facilitates and secures the magazines 500 in the dispenser 110. According to embodiments the keeper 180 preferably comprises a blocking member 181 that covers, in part or whole, the dispensing outlet 120. As depicted in the figures, the keeper 181 is removably positionable over the dispensing opening 120. The keeper 180 preferably is operated to provide ready access to the magazines 500 and to have them dispensed out of the dispensing opening 120 as needed by the user. The keeper 180 may be detachable from the device 110, or alternative, may have at least one detachable end and one fixed end. According to the embodiment illustrated, the keeper 180 is shown in a preferred configuration, which includes removably detachable portions or ends provided on the keeper 180 that are removably attachable to the device 110. The keeper 180 has a first removably detachable end 182, and a second removably detachable end 183, which attach to locations on the device 110. In the embodiment illustrated, the keeper 180 is includes a blocking member 181, shown comprising a band. The band 181 preferably is elastomeric and is resistant to corrosion, extreme environmental temperatures, and environmental elements, such as rain snow, ice. One end 183 of the keeper 180 remains secured to the device 110, while the other end 182 or portion is removed from its blocking position in front of the dispensing slot 120. According to some alternate embodiments, the keeper 180, may be releasably secured to the device 110, and may be removed from the device 110 (see e.g., FIG. 8B). According to some other embodiments, the keeper may have one end fixed to the device, and another end that is detachable to secure and release from an attachment point, such as, for example, a fastening button 187. The band 181 is shown having a plurality of attachment apertures 186, which permits the band 181 to be secured in a blocking position over the dispensing slot 120 of the device 110. A first fastening button 187 is provided on the device 110, and is shown located on the front wall 113 of the device 110, and a second fastening button 188 is shown provided at a second location of the device 110, shown disposed on the top 117 of the device 110. The band 181 is attached via slipping an aperture (e.g., apertures 186a, 186b) over the respective first and second fastening buttons 187, 188. For example, one end 183 of the band 181 may be secured to the second fastening button 188 (at the top of the device 110), and the other end 182 may be secured to the first fastening button 187 (shown located on the front wall 113 of the device 110). One end of the band 181 may remained fastened, while the other end is released, so that unblocking the dispensing opening may be accomplished with the band still attached to the device 110. For example, the band end 182 may be released from the attachment button 187 on the device front wall 113, and the band 181 moved aside or to some other position out of the way of the dispensing opening 120 (with the other band end 183 remaining secured to the top button 188). The band 181 preferably has at least two apertures for fastening to the buttons 187, 188, but according to preferred embodiments, may have more apertures, such as apertures along the length of the band 181 to provide alternate fastening points. The alternate fastening points may serve a number of purposes, for example, should the band break, or become stretched, or a fastening aperture deform, or if the dispensing opening being covered is empty, or contains magazines that are shorted or larger in their width profiles. Although the band 181 and apertures are referred to as being located and fastening at the band ends (e.g., 182, 183), the fastening may be accomplished by securing any of the spaced apart band apertures so that the band 181 suitable passes over the dispensing opening 120.

According to some alternate embodiments, not shown, the keeper may be fixedly mounted to the device. For example, a band may be secured at its first end at a first location of the device 110, which may be at the top of the device. A rivet or other suitable fastener may secure one end of the blocking member or band to the top of the device. The second end of the blocking member, such as a band, may be releasably secured at a fastening location on another location of the device, such as the front of the device. For example, the fastening location may include a mating Velcro® piece where the band has a Velcro® portion at the releasable end. Alternatively, according to some embodiments, the keeper may comprise a stretchable member, such as a rubber or elastomeric piece that is fixed at one end, and is stretchable to connect to a securing element at the releasable end. For example, the device top 117 may be configured with walls that are upstanding or recessed that may be used to pivotally secure an elastomeric band, while the front of the device, such as on the front wall 113, may be provided with a hook or other catch on which the end of the elastomeric band may releasably connect to secure the front opening 120.

The device 110 is shown comprising a handle 165. However according to alternate embodiments, the device may be constructed without a handle. Examples of such devices are shown in FIG. 11 and FIG. 13A.

Figure 15:
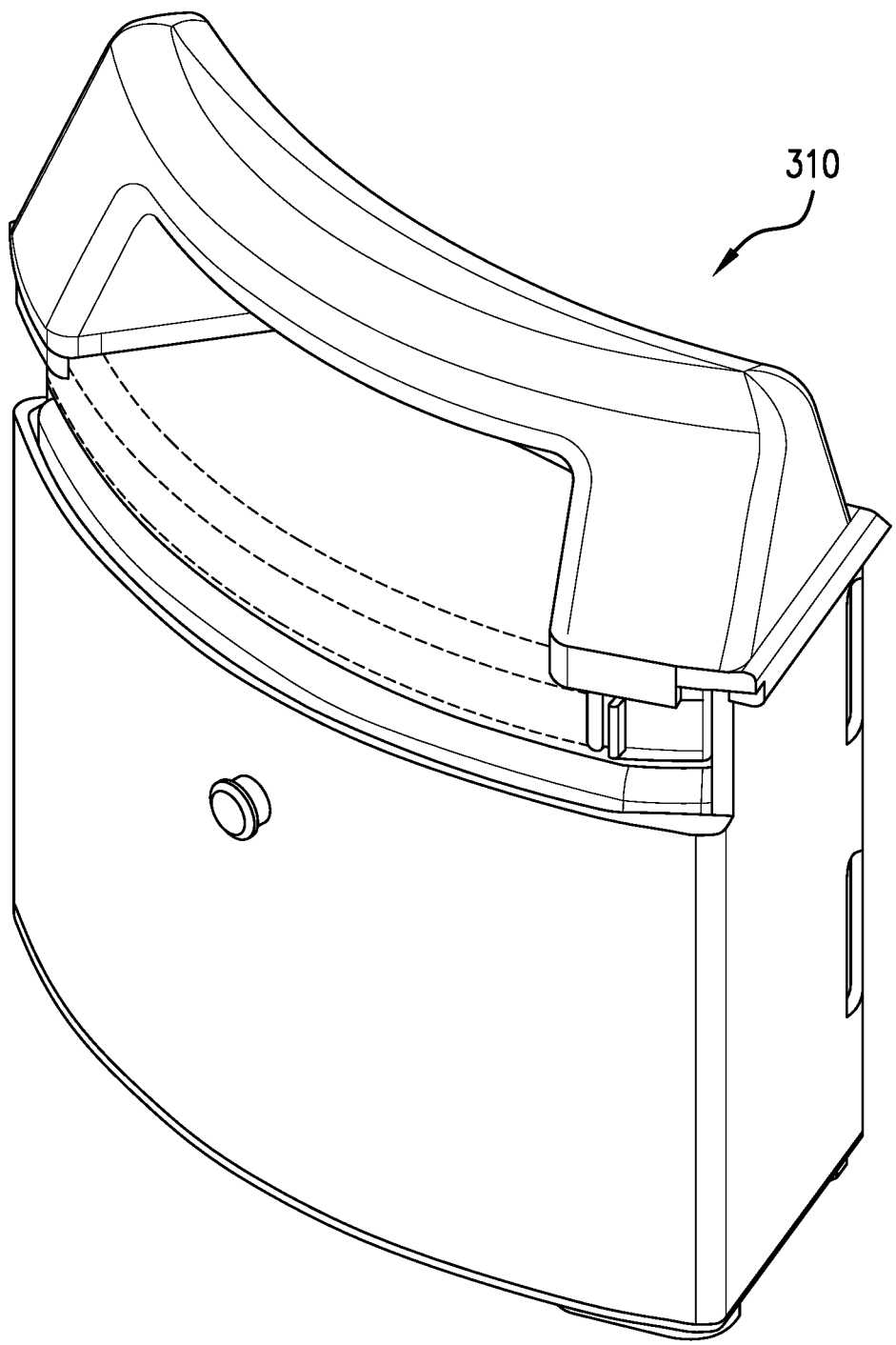
FIG. 15 is another alternate embodiment of a device for holding and dispensing magazines.

The devices may be constructed to accommodate a plurality of magazine sizes, even within a single device. Some devices may be constructed for accommodating magazines of particular sizes or types. An alternate embodiment of a device 310 is shown in FIG. 15, which has more curvature to its walls. Other sizes of the devices shown and described herein may be made consistent with the invention. For example, devices may be configured with a rectangular shaped body portion to hold and dispense rectangular magazines.

While the invention is described through the above-described exemplary embodiments, it will be understood by those of ordinary skill in the art that modifications to, and variations of, the illustrated embodiments may be made without departing from the inventive concepts disclosed herein. For example, although some aspects of the devices and system have been described with reference to a feature, those skilled in the art should readily appreciate that one or more features shown and described in connection with an embodiment may be combined, or separated into separate components. For example, the devices 210, 310 and 1110, represented as alternate embodiments, may be constructed to have features that are the same as those shown and described in connection with the device 110. In addition, although preferred embodiments of a magazine dispensing devices are illustrated in exemplary embodiments, the devices and system may be applied for use with other containers, and may be packaged with or carried in bags or other supporting devices. Furthermore, disclosed aspects, or portions of these aspects, may be combined in ways not listed above. Accordingly, the invention should not be viewed as being limited to the disclosed embodiments. The description is illustrative and is not to be construed as limiting the scope of the invention. Various modifications and changes may occur to those skilled in the art without departing from the spirit and scope of the invention described herein, and as defined by the appended claims.

What is claimed is:

1. A magazine dispenser for dispensing magazines for use in a firearm, the dispenser comprising:
    a) a body having a space therein;
    b) a dispensing opening;
    c) a supporting member; and
    d) biasing means for biasing the supporting member toward the dispensing opening;
    e) the dispensing opening having a width that at its widest dimension is greater than the longitudinal length of magazines that may be stored in the device;
    f) wherein the body space is radially configured, said body comprising a radially configured front wall, a radially configured rear wall, and a pair of sidewalls connecting said front and rear walls, said body including a bottom, and wherein said radially configured front wall, said radially configured rear wall, and said pair of sidewalls connect with said bottom; and wherein said radially configured front wall has a greater circumference than said radially configured rear wall.

2. The device of claim 1,
    wherein the body space has a width and a depth; and wherein the width of said body space is greater than the depth of said body space;
    wherein said supporting member is vertically biased in a vertical direction away from said body bottom.

3. The device of claim 1, including retractable feet that are pivotally mounted on the device bottom.

4. The device of claim 1, including retractable feet mounted with mounting means to the bottom of the device, wherein the device bottom comprises a bottom wall with recesses therein, and wherein said retractable feet are disposed in the respective recesses of the bottom wall.

5. The device of claim 1, including retractable feet pivotally mounted with mounting means to the bottom of the device, said retractable feet being mounted to pivot along a horizontal plane.

6. The device of claim 1, including retractable feet.

7. The device of claim 1, wherein said biasing means comprises a spring.

8. The device of claim 7, wherein said spring comprises a coil spring that is collapsible.

9. The device of claim 7, wherein said supporting member is slidably disposed within the body space.

10. The device of claim 7, wherein said collapsible spring includes a perimeter that is concentric.

11. The device of claim 10, wherein said concentric spring has substantially rectangular segments, including at least one upper segment; wherein the supporting member has a space therein, and wherein the upper segment is received within the supporting member space, the supporting member space being defined by a plurality of flanges.

12. The device of claim 8, wherein said supporting member comprises a platform having a front flange.

13. The device of claim 12, the spring having a first end and a second end, wherein the first spring end engages with the platform, and where the second spring end engages with the bottom of the device, and wherein the device includes means for securing the second spring end against movement.

14. The device of claim 13, wherein the means for securing the second spring end against movement comprises rails disposed inside the body space and along the bottom of the device.

15. The device of claim 12, wherein said platform has a top surface and an underside, and a spring guide provided on the underside thereof.

16. The device of claim 15, wherein the platform spring guide comprises spaced apart rails.

17. The device of claim 1, wherein and wherein said rear wall has at least one slot therein.

18. The device of claim 17, wherein said rear wall has a thickness, and wherein said slot is provided in said rear wall thickness, and wherein said slot is accessible from the exterior of the device.

19. The device of claim 14, including retractable feet mounted with mounting means to the bottom of the device, and wherein said mounting means mounting said feet to the device bottom comprise said posts.

20. The device of claim 7, including a keeper that comprises a blocking member that is removably positionable over said dispensing opening.

21. The device of claim 12, wherein said front flange is biased by said coil spring to cover said dispensing opening when the device is empty of magazines.

22. The device of claim 21, wherein said platform has a rear flange, a first side flange and a second side flange.

23. The device of claim 22, wherein said platform front flange, rear flange, first side flange and second side flange form containment space, and wherein a portion of the coil spring is captured within the containment space.

24. The device of claim 20, wherein said keeper comprises an elastomeric band, wherein said device has a first point of attachment for attaching said keeper, and wherein said device has a second point of attachment for attaching said keeper, wherein said keeper is removably attachable to and detachable from at least one of said first point of attachment and said second point of attachment, wherein said second point of attachment is provided on the device front wall.

25. A magazine dispenser for dispensing magazines for use in a firearm, the dispenser comprising:
a) a body having a space therein;
b) a dispensing opening;
c) a supporting member; and
d) biasing means for biasing the supporting member toward the dispensing opening;
e) wherein said biasing means comprises a coil spring that is collapsible and has a perimeter that is concentric;
f) wherein said spring has substantially rectangular segments;
g) wherein said supporting member comprises a platform that is slidably disposed within the body space;
h) wherein said platform has a front flange, rear flange, first side flange and second side flange that form a containment space, and wherein a portion of the coil spring is captured within the containment space;
i) wherein the coil spring has a first spring end and a second spring end, wherein the first spring end engages with the platform, wherein the device has a bottom, and wherein the second spring end engages with the bottom of the device;
j) wherein the device includes means for securing the second spring end against movement;
k) wherein the device includes mounting means for mounting the device to a structure; and
l) a keeper removably positionable over the dispensing opening.

26. A magazine dispenser for dispensing magazines for use in a firearm, the dispenser comprising:
a) a body having a space therein;
b) a dispensing opening;
c) a supporting member;
d) biasing means for biasing the supporting member toward the dispensing opening; and
e) fingers positioned to partially block the dispensing opening;
f) wherein said device body has a front wall with an upper edge; wherein said dispensing opening has a height, and wherein said dispensing opening has a lower boundary formed by the edge of said device front wall; wherein the device has a top wall, said top wall forming an upper boundary of said dispensing opening, and wherein said fingers are connected to said top wall, and wherein the height of the dispensing opening at the locations of said fingers is reduced by the extension of said fingers.

27. The magazine dispenser of claim 26, wherein the body includes a rear wall that is disposed opposite the dispensing opening.

* * * * *